US011925860B2

(12) United States Patent
Salvi et al.

(10) Patent No.: US 11,925,860 B2
(45) Date of Patent: Mar. 12, 2024

(54) PROJECTIVE HASH MAPS

(71) Applicant: NVIDIA Corporation, Santa Clara, CA (US)

(72) Inventors: Marco Salvi, Kirkland, WA (US); Jacopo Pantaleoni, Berlin (DE); Aaron Eliot Lefohn, Kirkland, WA (US); Christopher Ryan Wyman, Redmond, WA (US); Pascal Gautron, Alpes-Maritimes (DE)

(73) Assignee: NVIDIA Corporation, Santa Clara, CA (US)

( * ) Notice: Subject to any disclaimer, the term of this patent is extended or adjusted under 35 U.S.C. 154(b) by 456 days.

(21) Appl. No.: 17/343,008

(22) Filed: Jun. 9, 2021

(65) Prior Publication Data

US 2022/0395748 A1  Dec. 15, 2022

(51) Int. Cl.
*A63F 13/00* (2014.01)
*A63F 13/352* (2014.01)
*A63F 13/355* (2014.01)
*G06T 17/10* (2006.01)
*G06T 17/20* (2006.01)

(52) U.S. Cl.
CPC .......... *A63F 13/355* (2014.09); *A63F 13/352* (2014.09); *G06T 17/10* (2013.01); *G06T 17/20* (2013.01)

(58) Field of Classification Search
None
See application file for complete search history.

(56) References Cited

U.S. PATENT DOCUMENTS

2018/0181329 A1* 6/2018 Bhati .................. G06F 12/0897

* cited by examiner

*Primary Examiner* — Martin Mushambo
(74) *Attorney, Agent, or Firm* — Leydig, Voit & Mayer, Ltd.

(57) ABSTRACT

This application discloses techniques for generating and querying projective hash maps. More specifically, projective hash maps can be used for spatial hashing of data related to N-dimensional points. Each point is projected onto a projection surface to convert the three-dimensional (3D) coordinates for the point to two-dimensional (2D) coordinates associated with the projection surface. Hash values based on the 2D coordinates are then used as an index to store data in the projective hash map. Utilizing the 2D coordinates rather than the 3D coordinates allows for more efficient searches to be performed to locate points in the 3D space. In particular, projective hash maps can be utilized by graphics applications for generating images, and the improved efficiency can, for example, enable a game streaming application on a server to render images transmitted to a user device via a network at faster frame rates.

22 Claims, 14 Drawing Sheets

PROJECTIVE HASH MAPS

TECHNICAL FIELD

The present disclosure relates to data structures. More specifically, the embodiments set forth below describe techniques for generating projective hash maps using a processor or graphics processing unit. The embodiments disclosed herein are applicable to, among other technologies, use in computer rendering algorithms.

BACKGROUND

Hash maps are a powerful tool for indexing sparse data. They are particularly useful in accelerating computer rendering algorithms such as code utilized by video games. Hash maps can help to run these games at higher frame rates or to produce more photo-realistic graphics. Hash maps can be built in a first phase of an algorithm and then accessed during a second phase of the algorithm to speed up querying and data access. In some cases, a graphics processing unit can query a hash map in constant time. As one example, spatial hashing is often utilized to store and retrieve rendering-related information located in a three-dimensional (3D) world (e.g., data associated with a 3-element coordinate vector such as <x, y, z>). In such embodiments, the 3D coordinate (e.g., a hash key) can be processed by a hash function to generate a hash value based on the 3D coordinate. The data related to the location is then stored in the hash map based on the hash value. Moreover, such techniques can be easily extended to handle higher dimensional data by generating hash keys that include non-spatial properties, such as a normal vector, a level of detail (LOD), a timestamp, and so forth. An example of the use of spatial hashing is disclosed in Binder et al., "Fast Path Space Filtering by Jittered Spatial Hashing," which is incorporated by reference herein in its entirety.

An important drawback when using spatial hash maps is that locating spatially neighboring information typically requires the processor to perform an exhaustive search over all non-empty neighboring cells. In three-dimensions, such operations exhibit cubic complexity $O(N^3)$ and, therefore, it is only practical for very small regions of space. In a special case of small-curvature surfaces, spatial queries can be restricted to a local surface tangent plane. This can reduce the complexity of the search from $O(N^3)$ to $O(N^2)$, which is obviously preferable, but even this optimization breaks down for large search areas, non-planar surfaces, or if data is inserted into the hash map after a perspective projection.

Because locating spatially neighboring data is a very important operation in computer graphics (e.g., image filtering), it would be advantageous to efficiently retrieve neighboring data in a hash map. Thus, there is a need for addressing these issues and/or other issues associated with the prior art.

SUMMARY

Embodiments of the present disclosure relate to projective hash maps. Systems and methods are disclosed that allow for accelerated searching of non-empty cells in the hash map by replacing a search in 3D space with a search along a 2D projection surface. Reducing the number of dimensions of the hash key decreases the complexity of a spatial search over a local region in the 3D space.

In contrast to conventional systems, such as those described above, one or more projective hash maps are generated based on a projection of N-dimensional points onto a projection surface (e.g., a hypersurface of dimension N−1), where the projected coordinates on the projection surface are utilized to generate the hash key for the data for the point inserted into the projective hash map.

In accordance with one aspect of the present disclosure, a computer-implemented method for generating a projective hash map is described. The method includes receiving data associated with a plurality of points in an N-dimensional space. For each point in the plurality of points, the method further includes: projecting the point onto a projection surface to generate projected coordinates for the point; generating a hash value for the point based on a hash key that includes the projected coordinates; and adding data corresponding to the point to a data structure for the projective hash map based on the hash value. The projected coordinates have less than N dimensions.

In some embodiments, the N-dimensional space is a three-dimensional space, and the projected coordinates include two-dimensional coordinates <u, v>.

In some embodiments, the data is generated by a graphics application that is configured to render an image for display in accordance with a virtual camera position in the N-dimensional space. The projection surface is one of a plurality of projection surfaces arranged around the virtual camera position, and a first projection surface is co-planar with a near plane of a view frustum of the image. In an embodiment, projecting the point onto the projection surface comprises determining a surface index for a particular projection surface of the plurality of projections surfaces that intersects a ray that connects the point and the virtual camera position.

In some embodiments, the hash key further includes the surface index.

In some embodiments, the method further includes querying the data structure using a plurality of hash values. At least two hash values are generated based on hash keys that include different surface index values.

In some embodiments, the N-dimensional space is a three-dimensional space, the projection surface comprises a spherical surface, and the projected coordinates include two-dimensional coordinates <θ, φ>.

In some embodiments, the hash key further includes a level-of-detail (LOD) indicator. Adding the data corresponding to the point to the data structure includes: generating multiple hash values for different LOD indicator values; and adding multiple copies of the data to the data structure in accordance with the multiple hash values.

In some embodiments, the data is generated by a graphics application that is configured to render an image for display. The image is rendered in accordance with a virtual camera position in the N-dimensional space. The projection surface is located in the N-dimensional space relative to the virtual camera position to match a viewing plane of the image within the graphics application, and a level-of-detail (LOD) corresponding to a subdivision the projection surface matches a pixel resolution of the image.

In some embodiments, the hash key further includes a slice index based on a dimension d. The dimension d indicates a distance from the point to a virtual camera position associated with the projection surface or a distance from the point to the projection surface.

In some embodiments, the method further includes querying the projective hash map by: identifying a search area on the projection surface based on projected coordinates of a query point in the N-dimensional space; determining a plurality of hash values corresponding to the search area; and querying the projective hash map in accordance with the plurality of hash values for the search area to determine whether the projective hash map includes data for points that, when projected onto the projection surface, intersect the search area.

In some embodiments, at least one of the projected coordinates is quantized according to a quantization parameter prior to generating the hash key.

In some embodiments, the projective hash map is generated by a server or in a data center and utilized by a graphics application to generate an image. The image may be streamed to a user device via a network.

In some embodiments, the projective hash map is utilized by a graphics application to generate an image used for training, testing, or certifying a neural network employed in a machine, robot, or autonomous vehicle.

In accordance with a second aspect of the present disclosure, a system is described that includes a memory and a processor. The memory is configured to store data associated with a plurality of points in an N-dimensional space and a data structure for a projective hash map. The processor is configured to generate the projective hash map by, for each point in the plurality of points: project the point onto a projection surface to generate projected coordinates for the point; generate a hash value for the point based on a hash key that includes the projected coordinates; and add data corresponding to the point to the data structure for the projective hash map based on the hash value. The projected coordinates have less than N dimensions.

In some embodiments, the N-dimensional space is a three-dimensional (3D) space, and the projected coordinates include two-dimensional (2D) coordinates <u, v>. The data is generated by a graphics application that is configured to render an image for display in accordance with a virtual camera position in the 3D space. The projection surface is one of a plurality of projection surfaces arranged around the virtual camera position, and a first projection surface matches a near plane of a view frustum of the image.

In some embodiments, projecting the point onto the projection surface includes determining a surface index for a particular projection surface of the plurality of projection surfaces that intersects a ray that connects the point and the virtual camera position. The hash key further includes the surface index.

In some embodiments, the N-dimensional space is a three-dimensional space, the projection surface comprises a spherical surface, and the projected coordinates include two-dimensional coordinates <θ, φ>.

In some embodiments, the hash key further includes a level-of-detail (LOD) indicator. Adding the data corresponding to the point to the data structure includes: generating multiple hash values for different LOD indicator values; and adding multiple copies of the data to the data structure in accordance with the multiple hash values.

In some embodiments, the processor and the memory are included in a server or in a data center and the projective hash map is utilized by a graphics application to generate an image. The image may be streamed to a user device via a network.

In some embodiments, at least one of the projected coordinates is quantized according to a quantization parameter prior to generating the hash key.

In accordance with a third aspect of the present disclosure, a non-transitory computer-readable media is described for storing computer instructions. The computer instructions cause one or more processors to generate a projective hash map for storing data associated with a plurality of points in an N-dimensional space. The one or more processors, responsive to executing the computer instructions, perform the step of receiving data associated with a plurality of points in an N-dimensional space. The one or more processors further perform the steps of, for each point in the plurality of points: projecting the point onto a projection surface to generate projected coordinates for the point; generating a hash value for the point based on a hash key that includes the projected coordinates; and adding data corresponding to the point to a data structure for the projective hash map based on the hash value. The projected coordinates have less than N dimensions.

BRIEF DESCRIPTION OF THE DRAWINGS

The present systems and methods for generating and querying projective hash maps are described in detail below with reference to the attached drawings.

DETAILED DESCRIPTION

Systems and methods are disclosed related to projective hash maps. More specifically, projective hash maps can be used, among other applications, for spatial hashing of data related to three-dimensional (3D) points. Each point added to the projective hash map is projected onto a projection surface to convert the 3D coordinates for the point to 2D coordinates associated with the projection surface. The projected coordinates on the surface are then used to generate a hash key that is processed by a hash function to generate a hash value for the point. The hash value is then used as an index to store data in the projective hash map.

The projective hash map can simplify queries of the data structure to speed up an algorithm that searches for neighboring points. Instead of needing to perform an exhaustive search in three dimensions, the search can be performed in two dimensions, and then the values found can be analyzed to determine if the results match a criteria for the third dimension. This can significantly reduce the complexity of the search operation. More particularly, projective hash maps can speed up operations in rendering applications (e.g., video games) such as searching for other rays that intersect a surface near a different ray in a ray-tracing algorithm. By being able to search the set of rays projected through the scene faster, a given video frame can be processed faster, allowing more realistic images to be generated or allowing more frames to be generated per second, thereby providing a better experience for a player of the video game. Of course, projective hash maps are not confined to a video game context and any algorithm that could benefit from spatial hashing may be improved by incorporating a projective hash map into the algorithm.

The projective hash map can be utilized in a wide variety of applications that process spatial data (i.e., point data or geometry data). Graphics applications for rendering images based on model data are particularly suited to utilize projective hash maps to speed up various operations. In particular, an application can utilize a projective hash map to quickly query any objects that may be visible at a particular screen location (e.g., pixel location) of an image.

Figure 1A:
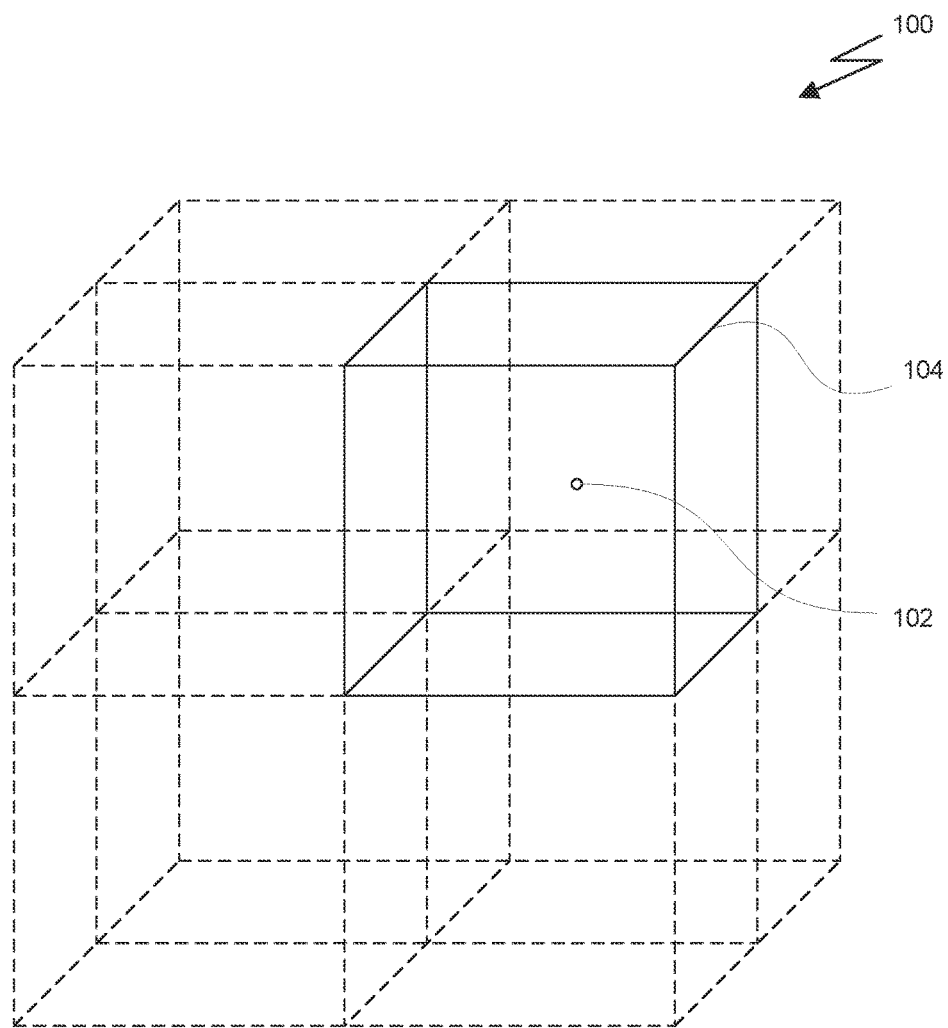
FIG. 1A illustrates spatial partitioning of a three-dimensional space, in accordance with the prior art.

FIG. 1A illustrates spatial partitioning of a three-dimensional space, in accordance with the prior art. Spatial partitioning refers to a technique for dividing a space into two or more subsets, which allows the space to be represented by a variety of different data structures. For example, spatial partitioning can store data related to points in a space in binary space partitioning (BSP) trees, k-d trees, or octrees. Spatial partitioning is particularly useful for optimizing various algorithms in computer graphics.

As depicted in FIG. 1A, a world space 100 can be divided by three mid-planes to split the world space 100 into octants (as shown by the dashed lines). As used herein, a world space is defined as a three-dimensional Euclidean space. A point 102 lies in one of the octants 104 (shown with solid lines). In some applications, data for the point 102 can be added to a data structure that is used to accelerate certain operations.

In one example, the data can be stored in a data structure referred to as an octree. A root node of the octree represents the world space 100, and each node in the octree includes eight child nodes, with each child node representing one of the octants of the space corresponding to the parent node. Each child node of the root node can then include eight child nodes, each child node representing an octant of the space represented by the parent node, and so on and so forth. The octree can be balanced, where all of the leaf nodes are located at the same depth of the octree, or unbalanced, where each octant can be recursively subdivided as needed depending on the distribution of points in the space, and each leaf node stores either the data or a pointer to the data inserted into the octree based on the index generated using the spatial coordinates. If the size of the data is fixed, then the data can be stored in the octree directly. Alternatively, if the size of the data is variable or multiple entries can be stored for each index (e.g., due to collisions), then a pointer to the data in a separate data structure (e.g., a linked list) can be stored in the octree.

It will be appreciated that each octant can be recursively split into additional smaller octants to subdivide the world space 100 into smaller subdivisions in order to reduce the chance that two proximate points lie in the same subdivision of the world space 100. However, further division of the world space 100 into smaller and smaller subdivisions will likely result in a sparsely populated octree due to the spatial distribution of the original keys (e.g., point distribution). The octree, therefore, is not a compact way to store data for points that are sparsely populated in the world space 100. Further, using larger subdivisions of the world space 100 can lead to large numbers of collisions with multiple points corresponding to the same subdivision of the world space 100, which can decrease the efficiency of the optimization.

One solution to this problem is spatial hashing. In spatial hashing, a hash function uses the spatial coordinates of a point as a key to generate a hash value. It will be appreciated that hash functions are typically designed to distribute the data approximately uniformly among the available buckets (e.g., unique hash values) regardless of the distribution of the keys used to generate the hash values. However, such hash functions can cause data for two keys having a short Euclidean distance between the keys to be stored in different buckets having a large distance between the corresponding hash values. In other words, even keys (e.g., 3D coordinates) located next to each other can result in hash values that are vastly different. This can complicate a search for data for other points proximate a given point because that data can be widely distributed within the hash map.

Figure 1B:
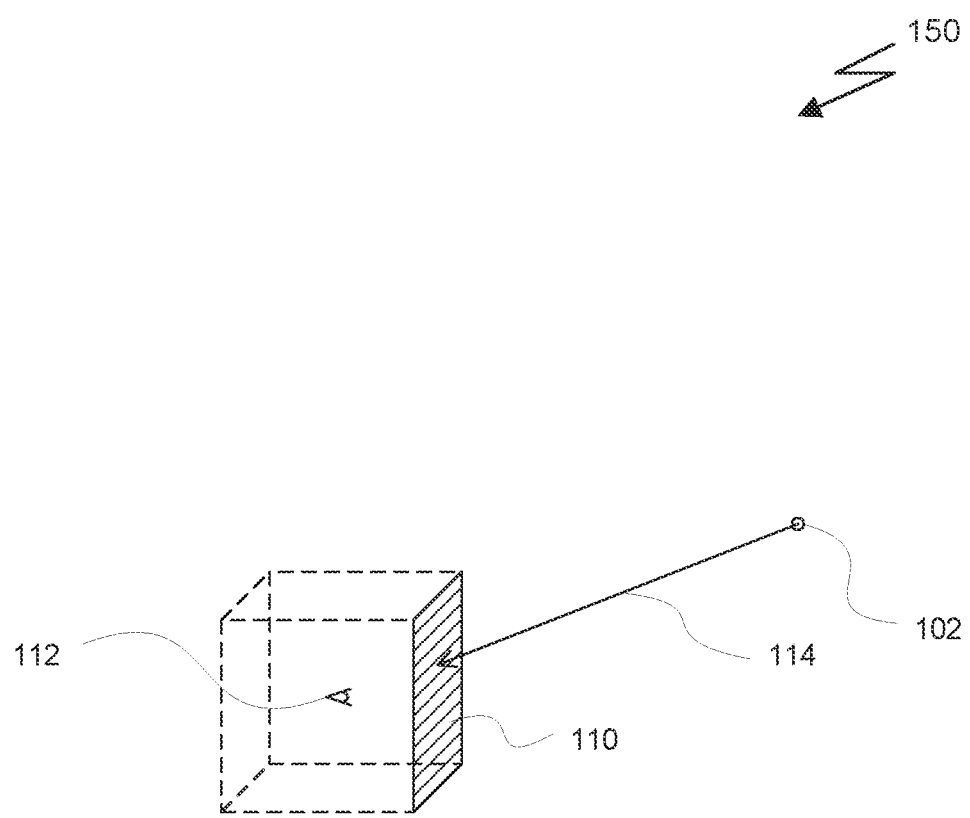
FIG. 1B illustrates a projection operation associated with a flat surface, in accordance with some embodiments.

FIG. 1B illustrates a projection operation 150 associated with a flat surface, in accordance with some embodiments. While using spatial hash maps has benefits such as reducing the time required to locate data related to a particular location in the world space, the ability to search for data within a particular volume is much more complicated as the function of the points within the volume to hash values is not typically a simple linear transformation. One technique to reduce the complexity of the search is to reduce the dimensionality of the hash key.

In some embodiments, the coordinates of a point in the world space are projected onto a surface to generate a set of projected coordinates. In the case of 3D coordinates, the projected coordinates can be 2D coordinates <u, v> defined for a projection surface. As shown in FIG. 1B, a projection surface 110 can be defined in the world space. In an embodiment, the projective hash map is utilized in a computer graphics application that is configured to render a scene based on 3D geometry (e.g., points, lines, triangles, and other graphics primitives). The graphics application can define a virtual camera 112 location and orientation in the world space. The graphics application can also define a view plane relative to the virtual camera 112 that is subdivided into a number of picture elements (e.g., pixels) that define the components of a rendered image that is presented on a display. The view plane defines a frustum that encompasses all points in the world space that are visible to the virtual camera 112.

In an embodiment, the projection surface 110 may contain a view plane of the graphics application. In other words, a particular projection surface may be co-planar with a near plane of a view frustum of the image generated by the graphics application. In some embodiments, the projection surface 110 can have a larger spatial extents than the view plane (i.e., at least some of the rays that intersect the projection surface 110 are not visible in the images produced by the application). In some cases, the projection surface 110 may be equal to the view plane when a field of view of the virtual camera 112 is exactly 90 degrees and an image aspect ratio is 1:1. When processing points in the world space to add data to the projective hash map, a point 102 is projected onto the projection surface 110 to determine a point on the projection surface 110 corresponding to the point 102. As shown in FIG. 1B, a ray 114 can be projected from the point 102 to the virtual camera 112, and an intersection between the ray 114 and the projection surface 110 defines the point on the projection surface 110, namely the projected coordinates.

The projected coordinates are then processed by a hash function to generate the hash value, which is used to insert data related to the point 102 into the projective hash map. In some embodiments, the hash function can be a standard hash function such as message digest 5 (MD5), secure hashing algorithm 2 (e.g., SHA-256, SHA-512, etc.), and the like, or can be a custom hash function designed for a particular application (e.g., any cryptographic hash function that provides a fixed length hash value).

As an example, a 3D point located at <3, 4, 5> might be projected onto a projection surface that converts the 3D point to a projected point of <1, 3>. The hash function then converts the point <1, 3> into a hash value of, e.g., 256-bits in length, which is used to store data into the projective hash map. Any conventional hash table format may be used as the data structure for storing the data in the projective hash map.

In some embodiments, the data format of the coordinates in the world space is a floating point format (e.g., 32-bit single precision floating point format defined by IEEE 754). In other embodiments, the data format of the coordinates in the world space can be fixed point or integer formats. In some embodiments, the data format of the coordinates in the projection surface can be an integer format (e.g., 16-bit integers) or a fixed point format (e.g., Q1.15). It will be appreciated that performing a search over the projection surface using a floating point format for coordinate values would be excessively complicated and the distance between adjacent coordinates would increase as the coordinates got larger. Therefore, floating point values for coordinates of the projection surface are discouraged. By choosing a fixed point or integer representation of the projection surface coordinates, each discrete coordinate value can be fixed and equidistant from other coordinates at the same level-of-detail, as discussed more fully below.

As the hash functions are designed to process a bit stream, the input to the hash function can be generated by appending the projected coordinates sequentially to create the bit stream. For example, the first 16 bits of the bit stream represent the u coordinate and the second 16 bits of the bit stream represent the v coordinate of the projection surface 110. In some embodiments, the hash key can also include other values, such as a LOD indicator in multi-level projective hash maps. It will be appreciated that, as applied to spatial hashing of a 3D space, while the key to the hash function can include more than two dimensions, the number of spatial dimensions is limited to two dimensions to enable more efficient spatial queries. However, the concepts described herein for 3D spaces can be extended to N-dimensional spaces (e.g., 4-dimensional, 5-dimensional, etc.) projected into a smaller number of dimensions (e.g., N−1) for processing by a hash function.

It will be appreciated that, unlike the case of standard spatial hashing using 3D coordinates, all points that lie on the ray 114 project to the same point on the projection surface 110. This makes locating points along the ray 114 relatively straightforward as they cause a collision when being inserted into the projective hash map. However, any points located even slightly off the ray 114 that have different projected coordinates will generate a different hash value. Nevertheless, a search within a local area on the projection surface 110 can locate all points neighboring point 102. Such a search will actually return any points within a search frustum that includes the ray 114, and such points may or may not be "close" to point 102 as such points may be located at any depth d from the virtual camera 112. Nevertheless, an exhaustive search of points within a local area on the projection surface has complexity of $O(N^2)$ rather than the complexity of $O(N^3)$ as with traditional spatial hashing and can significantly improve the efficiency of querying the projective hash map for neighboring points.

It will also be appreciated that not all points in the world space will be projected onto the projection surface 110, as any points outside of the viewing frustum may not intersect the view plane when projected back to the virtual camera 112. In some embodiments, a set of projection surfaces are defined corresponding to a set of complementary projective hash maps. In an embodiment, a cube can be defined that includes six projection surfaces that intersect at twelve edges. Projecting a ray from the virtual camera 112 through the point 102 will intersect exactly one of the six projection surfaces (unless the ray intersects exactly one of the edges or vertices shared by two or three projection surfaces of the cube). The projected coordinates are generated for that projection surface along with a surface index (e.g., 0 . . . 5) corresponding to the intersected projection surface. The hash function then converts the projected coordinates into a hash value, and the data for the point is then added to a particular projective hash map corresponding to the surface index. In some embodiments, where the ray intersects an edge between two projection surfaces, or even a vertex shared by three projection surfaces of the cube, the data can be added to both (or all three) projective hash maps corresponding to the edge (or vertex).

In one embodiment, separate data structures are generated and stored in the memory for each distinct projection surface. In this case, the hash value is based on a key that includes the two projected coordinates but not the surface index, which is only used when selecting which data structure to insert the corresponding data. In another embodiment, a single projective hash map is generated and stored in the memory for all six projection surfaces, and the hash value is based on a key that includes the projected coordinates as well as the surface index. Even if the six projection surfaces utilize similar projected coordinate ranges such that the same coordinates are associated with different locations on the six different projection surfaces, the addition of the surface index to the hash key is enough to cause the same projected coordinates to hash to different hash values in order to avoid collisions in the projective hash map.

It will be appreciated that, in some embodiments, the cube (i.e., where all six projection surfaces are of equal size) can be a prism (i.e., where six projections surfaces are of unequal size). For example, where a view frustum is associated with a view plane that has different dimensions in the horizontal and vertical dimension (e.g., corresponding to a 1,920 pixel×1,080 pixel image), then four projection surfaces of the cube (e.g., the "sides") can be rectangular while two projection surfaces (e.g., the "top" and "bottom") can be square, forming a rectangular prism.

It will also be appreciated that points between the projection surface 110 and the virtual camera 112 can be projected out towards the projection surface whereas points beyond the projection surface 110 can be projected back towards the virtual camera 112. In this manner, all points in the world space (with the exception of the location of the virtual camera 112) have a corresponding projected coordinate. In an embodiment, default projected coordinates for the location of the virtual camera (e.g., <0, 0>) can be defined to solve the issue of projection related to this unique point.

Figure 1C:
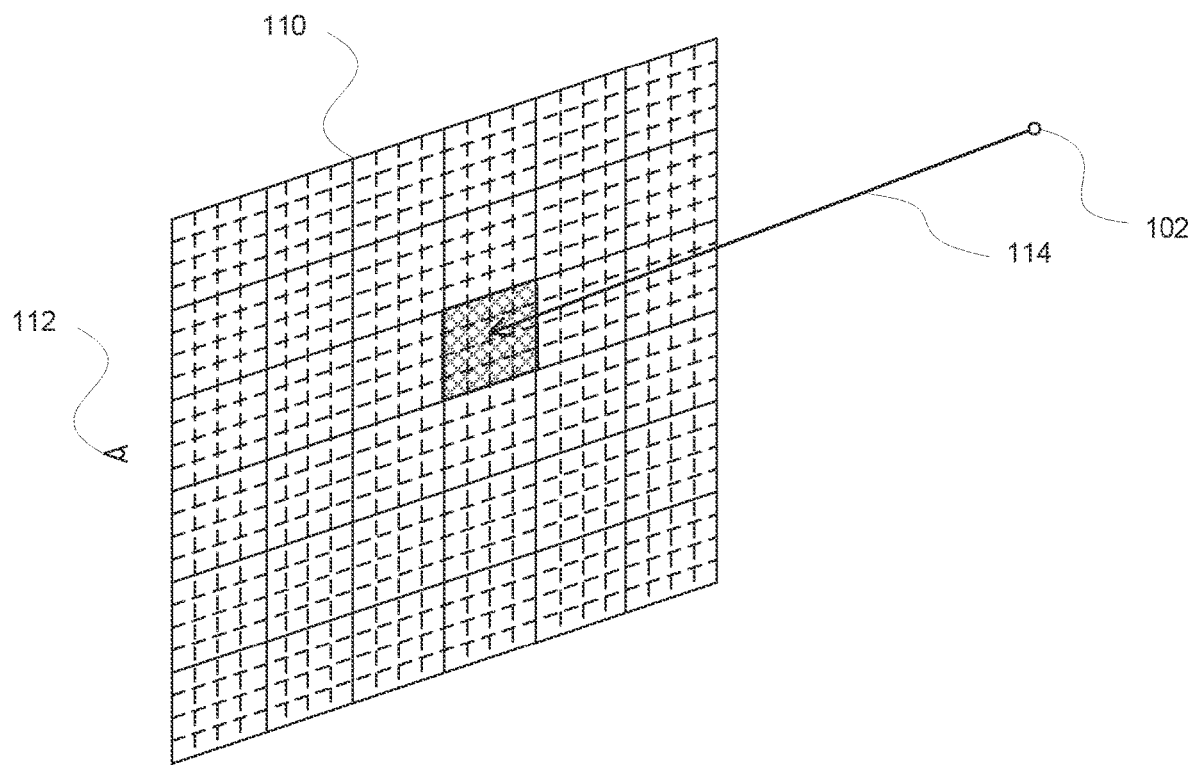
FIG. 1C illustrates a division of a projection surface into multiple levels of detail, in accordance with some embodiments.

FIG. 1C illustrates a division of a projection surface into multiple levels of detail (LOD), in accordance with some embodiments. A projective hash map with a single LOD refers to a projection surface that is divided into a set of cells (e.g., pixel elements) where each cell corresponds to a particular projected coordinate. If the sizes of the cells are fixed, then the choice of subdivision is such that the projective hash map has a single LOD.

In order to avoid collisions between different points in the world space, the subdivisions of the projection surface must be small enough that it is less likely that any two points project to the same cell and, therefore, would be hashed using the same set of projected coordinates. At the same time, if the cell size is too small, then a query of the projective hash map for nearest neighbors to a specific point may be inefficient because the projective hash map is sparsely populated. In other words, the query algorithm may need to search hundreds or even thousands of neighboring cells in order to find an occupied cell with another point (i.e., a cell matching a hash value where data has been inserted into the projective hash map).

In one embodiment, converting the 3D coordinates into projected coordinates can be performed in accordance with a desired LOD. For example, as shown in FIG. 1C, a projection surface 110 can be divided into a number of large cells (represented by the shaded area) at a first LOD. In addition, the projection surface 110 can also be divided into a number of smaller cells (represented by the dashed lines so that 16 smaller cells are enclosed within each large cell) at a higher LOD. Each cell at the first LOD can be assigned a particular projected coordinate, and each cell at the second LOD can be assigned a different projected coordinate.

For example, each cell can be assigned projected coordinates <row, col> that are incremented from <0, 0> in the upper row and left-most column. The first LOD has, as shown in FIG. 1C, 6 rows and 6 columns, but the second LOD has 24 rows and 24 columns. The point 102 thus has different projected coordinates at the first LOD and the second LOD. As depicted in FIG. 1C, the point 102 has projected coordinates of <2, 3> at the first LOD and projected coordinates of <9, 14> at the second LOD.

In one embodiment, the projective hash map can be generated for a specific LOD that can be selected based on the desired resolution of a particular operation. For example, a graphics application can determine an appropriate LOD for a particular operation based on one or more criteria. A lower LOD (e.g., lower resolution) can be chosen for faster operations with less accuracy or for fewer data points, and a higher LOD (e.g., higher resolution) can be chosen for slower operations that require more accuracy or a large number of data points. In an embodiment, the graphics application can set the level of the LOD dynamically based on, e.g., processing capacity, characteristics of the computing system, measured performance of prior operations, or any other desired criteria.

In another embodiment, the projective hash map can be generated at multiple LOD. An operation to generate projected coordinates for particular 3D coordinates can generate projected coordinates corresponding to two or more LODs. A separate hash value is then generated for each LOD by hashing the different keys that include, e.g., the projected coordinates and a corresponding LOD indicator. In the example above, a first hash value can be generated for hash key <2, 3, 0> and a second hash value can be generated for hash key <9, 14, 1>. The same data for the point 102 can then be inserted to the projective hash map using both the first hash value and the second hash value.

Once a projective hash map has been populated, a query of the projective hash map can be performed at a desired LOD. For example, for a coarse search grid, a first LOD can be used. This allows the query operation to search a larger volume of world space in a shorter amount of time. However, at a lower LOD, it is more likely that collisions between multiple points will occur when building the projective hash map at that LOD, and a hit for particular projected coordinates could turn up a large number of points associated with those projected coordinates. Nevertheless, the coarse search grid can be useful to quickly narrow a search down to a particular grid and then a more refined search at a higher LOD can be performed within that cell of the projection surface.

Of course, the number of LODs within a particular projective hash map is not limited. However, the number of LODs will increase the amount of data that is stored in the projective hash map and, for a fixed size projective hash map, could increase the chances of collisions between points.

In some embodiments, the hash keys can be quantized based on the desired level of detail. For example, suppose the size of the cells of the projection surface 110 are fixed at a particular level of detail, thus each cell represents a particular area of the projection surface 110. When the point 102 is projected onto the projection surface 110, the resulting projected coordinates will overlap one cell (or two or three cells if the point falls directly on a border between cells). Once the projective hash map is populated, a lookup operation for that projected coordinate will return the information for the point 102. In general, a memory access operation will typically fetch a fixed amount of memory, e.g., 128 bytes, which may be referred to as a cacheline. In some embodiments, two or more cachelines can be fetched for each lookup operation of the projective hash map. If each entry into the projective hash map is stored in, for example, 16 Bytes, then each memory access associated with a lookup will fetch information for eight entries of the projective hash map related to sequential hash values (e.g., 8*16=128 bytes). However, these eight entries do not necessarily correspond to spatially adjacent cells of the projection surface 110.

In one embodiment, the projected coordinates can be quantized prior to generating the hash key such that a group of cells of the projection surface all correspond to the same hash value. For example, by truncating a least significant bit of each of the two projected coordinates, the hash function effectively hashes a group of 2×2 cells to generate a common hash value for each cell in the group. It will be appreciated that, in some embodiments, the individual coordinates of the projected coordinates can be quantized differently, such that the group of cells can have dimensions of, e.g., a 2×2, 1×4, 4×1, 2×4, 4×2, 4×4, 2×8, or 8×2 arrangement, as well as further increments based on the power of 2. This can be performed by truncating varying number of bits from each projected coordinate to increase the length of the group in that dimension disproportionately.

While quantizing the projected coordinates when building the hash keys can increase the rate of collisions in the projective hash map because it is effectively reducing the LOD of the projective hash map, it allows a faster 2D search to be performed by searching groups of cells rather than individual cells. Because the processor performing the lookup accesses a fixed amount of memory, it makes sense to match the size of the cells to the fixed size of memory that is fetched by the processor (or multiples thereof). It will be appreciated that a LOD of the cells and a quantization parameter for each of two or more projected coordinates can be implemented in tandem, and that a common quantization arrangement or different quantization arrangements can be selected for each of two or more LODs. For example, a first LOD may utilize quantization parameters that result in groups of 1×1 cells while a higher LOD that has, e.g., 4×4 cells per cell in the first LOD may choose to utilize quantization parameters that results in groups of 2×2 or 2×4 cells being stored sequentially using the same hash value.

In some cases, collisions in the group of cells are simply stored in the cacheline in the order in which the data was added to the projective hash map. Thus, while a larger group of cells is likely to cause more collisions, the entry of the projective hash map can store up to the same number of blocks of information in a single entry as the number of cells in the group. In other embodiments, the hash values returned from the hash function can be combined with the truncated bits of the projected coordinates (i.e., an offset) to generate distinct hash values that correspond with the corresponding cells identified by the original projected coordinates. Thus, even though all entries corresponding to a group of adjacent cells on the projective surface 110 will be stored to a common cacheline, the location (i.e., offset) of the block of information in the cacheline can also be used to indicate which cell in the group of cells corresponds to the projected coordinates for that block of information, and only one entry per cell is permitted to be stored in a cacheline.

It will be appreciated that, in embodiments that combine the returned hash value with the truncated bits of the projected coordinates, blocks of information for different, unrelated groups of cells can be stored in a single allocated block of memory (e.g., a cacheline), which can lead to a more efficient use of memory when the points are sparsely populated. For example, if one point projected into a first group of cells corresponds to a first offset of the hash value and a second point projected into a second group of cells corresponds to a second offset of the hash value, and even though the two groups of cells are unrelated and have different projected coordinates, the information for both the first point and the second point can be stored in the same entry of the hash map as long as the offset values (i.e., the truncated bits of the projected coordinates) for the points are not the same.

For example, if the group of cells is a 2×2 group of cells, then the offset value is given by the two truncated bits of the projected coordinates, one truncated bit from each dimension of the projected coordinates and has a value within the range of $\{0,1\}\times\{0,1\}$. The final hash index into the cacheline is given by $h\_final = h + o\_x + 2*o\_y$. The advantage of this is that information projected into cells adjacent in world space can be stored in adjacent locations in memory without having to a priori reserve the entire cacheline for the group of cells without knowing how it will be populated. The cacheline can then be populated for points until there is a collision based on both the hash value h and the offset o. It will be appreciated that the same concept can be adapted for projective hash maps of higher dimensions, such as four dimensions, where the projected coordinates include three dimensions. In that case, the final hash index into the cacheline is given by $h\_final = h + o\_x + 2*(o\_y + 2*o\_z)$.

Figure 1D:
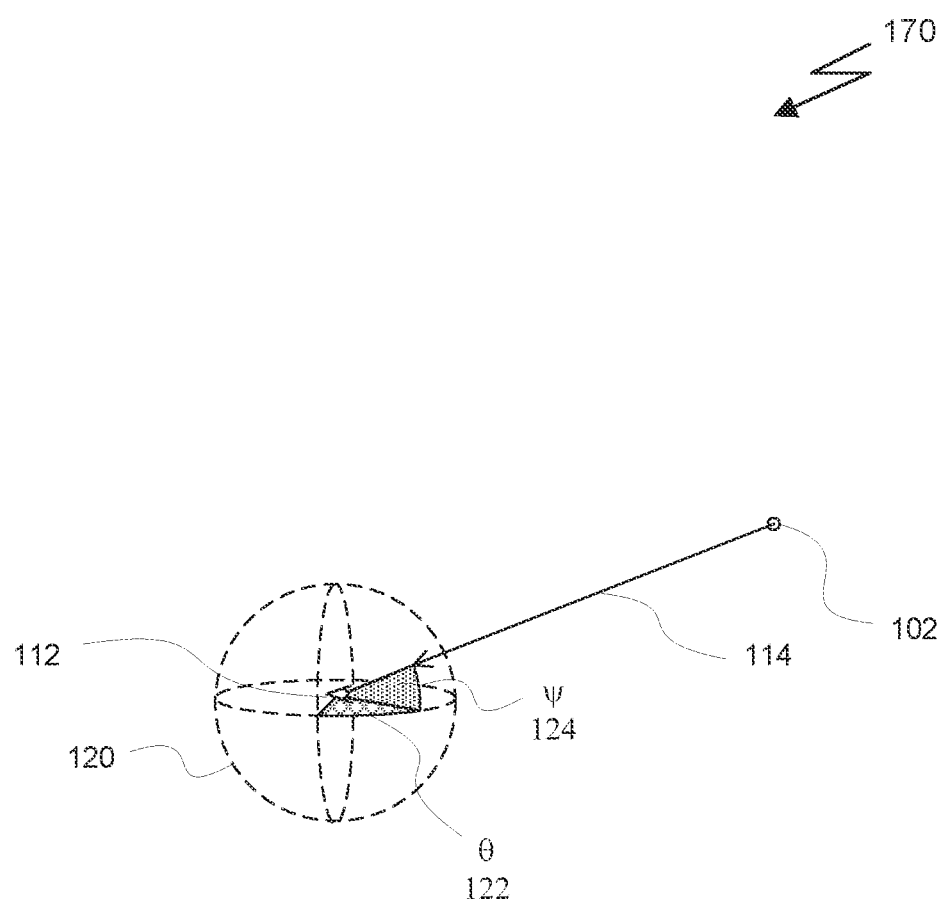
FIG. 1D illustrates a projection operation associated with a spherical surface, in accordance with other embodiments.

FIG. 1D illustrates a projection operation 170 associated with a spherical surface, in accordance with other embodiments. It will be appreciated that the projection surfaces are not required to be flat in the world space. In an embodiment, the projection surface 120 is a sphere, centered on the virtual camera 112. A ray 114, projected from the point 102 back to the virtual camera 112 intersects the projection surface 120 at a point that can be defined, using spherical coordinates <θ,Ψ>, where θ represents a longitude dimension 122 and Ψ represents a latitude dimension 124. In this case, every point in the world space has corresponding projected spherical coordinates corresponding to the projection surface 120. Consequently, unlike the embodiment described above using a set of projection surfaces to capture all points in world space, this embodiment can utilize a single projection surface to project all points in the world space into the projected coordinates space.

In the case of a spherical projection surface, a search among a local area of longitude and latitude coordinates can be used to find all points close to the point 102, which will project to a small area on the spherical projection surface. Other types of complex projection surfaces are contemplated as being within the scope of the present disclosure as long as each point in the world space can be mapped to a single corresponding point on the projection surface and neighboring points in world space project to a corresponding neighboring area on the projection surface.

Figure 2A:
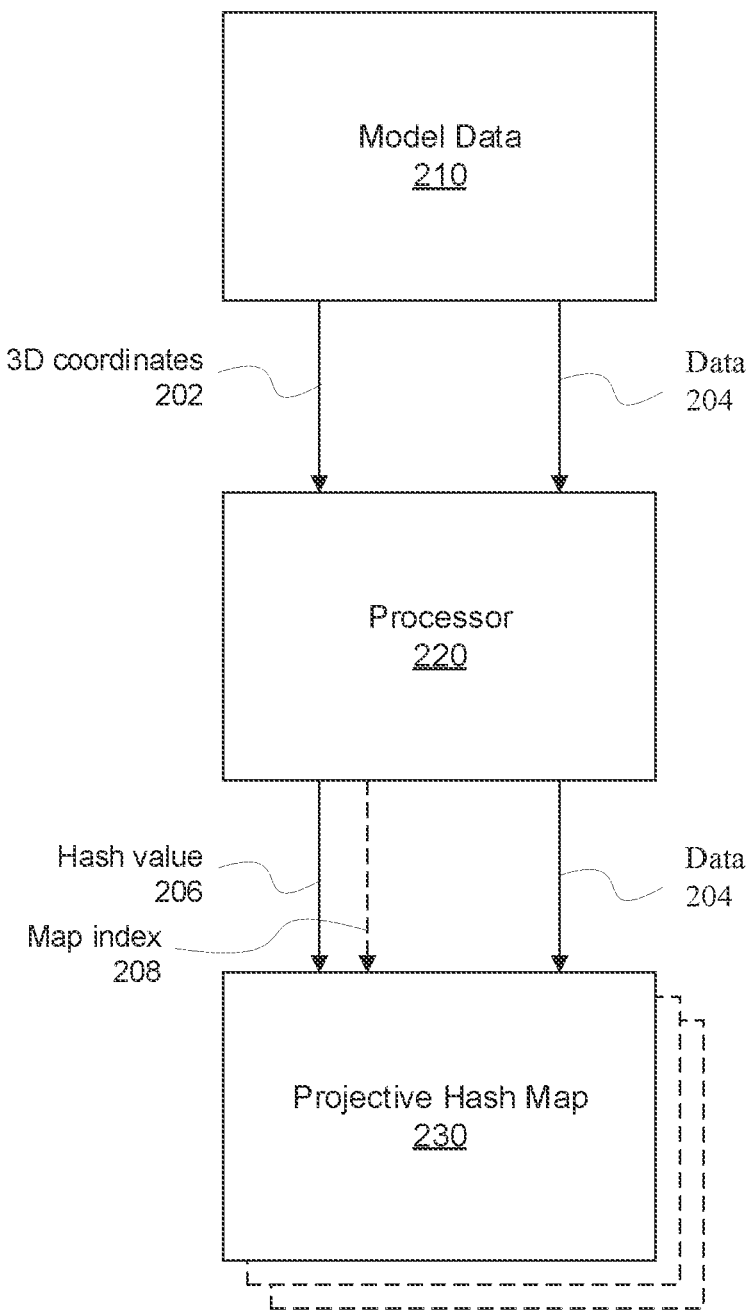
FIG. 2A illustrates a system for generating a projective hash map, in accordance with some embodiments.

FIG. 2A illustrates a system 200 for generating a projective hash map 230, in accordance with some embodiments. In an embodiment, the system includes a processor 220 and a memory that stores model data 210 and a data structure for a projective hash map 230. In an embodiment, the model data 210 comprises geometry data including 3D coordinates 202 associated with points in a space, such as a 3D space (e.g., world space) associated with a graphics application. Each point corresponding to 3D coordinates 202 can also, optionally, include data 204. The data 204 can be, e.g., additional data such as a surface normal vector, color information, an identifier of an object associated with the point, a value such as a temperature or other measurement associated with the point, and so forth. The data 204 can encompass any type of data that can be associated with a point in space, including a vector of one or more scalar values, a data structure, or a file storing information. The type of data 204 is not relevant for generating the hash value for the point and, therefore, will only affect the size and/or structure of the data structure for the projective hash map 230. In some embodiments, the data 204 can be omitted and the 3D coordinates 202 for each point are substituted as the data 204 for the point that is stored in the projective hash map 230. For example, such embodiments may be useful when storing a point cloud (absent any other data other than the coordinates for the point) in an acceleration data structure such as the projective hash map.

For each point in the model data 210, the processor 220 is configured to read the 3D coordinates 202 and the corresponding data 204 (if available) from the memory. Although not shown explicitly in FIG. 2A, the memory can be any volatile or non-volatile memory such as a dynamic random access memory (DRAM), flash memory device, hard disk drive (HDD), solid state drive (SSD), or the like, as well as combinations thereof, capable of storing the model data 210. In an embodiment, the model data 210 comprises a set of geometry primitives (e.g., triangles, quads, triangle fans, lines, points, etc.) as may be defined in accordance with a computer graphics standard such as OpenGL or Direct3D, among others. In other cases, the model data 210 can be data in another format, such as point cloud data generated by a light detection and ranging (LiDAR) device, depth camera, or similar technology.

The processor 220 is configured to execute a two-step process. A first step includes processing the 3D coordinates 202 in accordance with a projection operation to generate projected coordinates corresponding to the 3D coordinates 202. In one embodiment, the projected coordinates are 2D coordinates associated with the projection surface. In one embodiment, the 2D coordinates can be a screen space coordinate <u, v> associated with a screen space corresponding to a view plane (e.g., a pixel coordinate). In another embodiment, the 2D coordinates can be 3D coordinates of the intersection point between a ray 114 and the projection surface 110, where one dimension of the 3D coordinates is truncated because all points on the projection surface 110 have the same coordinates in that single dimension (e.g., one and only one of the x, y, or z coordinates is constant for each surface of a cube that is aligned with the three orthogonal axes of the world space). In other words, the 2D coordinates are selected as two of the three coordinates of the 3D coordinates in world space of the intersection point of the ray 114 with the projection surface 110 (e.g., <x', y'>, <x', z'>, or <y', z'>). In yet another embodiment, the 2D coordinates are spherical coordinates <θ, Ψ> associated with a spherical projection surface.

Once the processor 220 has converted the 3D coordinates 202 into corresponding projected coordinates, the processor 220 executes a second step that applies a hash function to a hash key to generate a hash value 206. The hash key can be the projected coordinates or the projected coordinates as well as some additional information such as a LOD indicator, and the like. The processor 220 then stores the data 204 corresponding to the point having the 3D coordinates 202 into the projective hash map 230 using the hash value 206 as an index for the data 204. In some embodiments, the data 204 can include a copy of 3D coordinate data 202 corresponding with the data 204, such that the processor 220 can easily read the 3D coordinates for the point from the data stored in the projective hash map 230.

In one embodiment, the processor may also generate at least one map index 208 that is used to select one or more related projective hash maps 230 in which to store the data 204 corresponding to the hash value 206. As described above, in some embodiments, the first step can include determining which of a plurality of projection surfaces are intersected by a ray 114 in order to identify an index associated with the intersected projection surface. Each projection surface has a corresponding projective hash map 230, and the identified index for the projection surface is used to select a corresponding one of the projective hash maps 230. In the case where a ray 114 intersects an edge or a vertex between two or more projection surfaces, then the map index 208 can include multiple indices for the projective hash maps corresponding to the projection surfaces that share the edge or vertex. In another embodiment, the map index 208 can be included in the hash key and used to vary the hash value for the projected coordinates based on the particular projection surface intersected by the ray 114. In such cases, only a single data structure is used for the projective hash map 230, which stores data for the full set of projection surfaces.

Figure 2B:
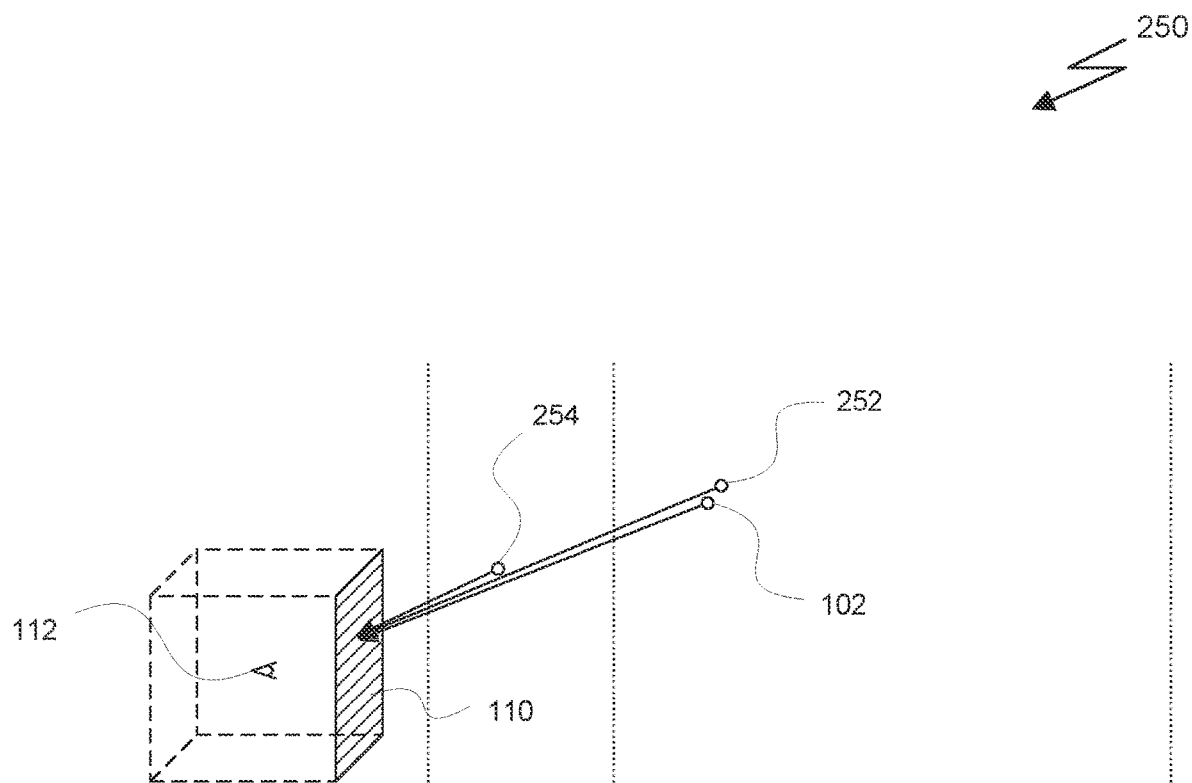
FIG. 2B illustrates a world space associated with the projective hash map, which is subdivided into slices, in accordance with some embodiments.

FIG. 2B illustrates a world space 250 associated with the projective hash map 230, which is subdivided into slices, in accordance with some embodiments. It will be appreciated that a search over the local area on the projection surface 110 can return both neighboring points in the world space as well as points that are located far from the query point 102 but that are projected close to the query point on the projection surface. For example, generating a projective hash map for the three points in FIG. 2B generates hash values for the points 102, 252, and 254 that have projected coordinates on the projection surface 110 that are within a small local area on the projection surface 110. Therefore, a search looking for neighboring points to point 102, conducted over the small local area on the projection surface 110 surrounding the projected coordinates for point 102, will likely return data for points 252 and 254. However, point 252 is located much closer to point 102 than point 254. In algorithms that conduct a search for neighboring points to point 102, results to a query of the projective hash map may still require significant culling of the search query results to determine which points are actually close to the query point in the world space.

In an embodiment, the projective hash map 230 can include multiple slices, where each slice stores data for a separate subset of points in the world space. In an embodiment, each slice corresponds to a slice index that is calculated as a function of a depth d of the point from the virtual camera 112. Rather than simply using the depth d for each point as a third coordinate of the hash key directly, the depth d can be transformed and quantized to create convex hulls that encompass different subsets of points in the world space, with each convex hull corresponding to a separate slice of the projective depth map. The separation between slices is illustrated conceptually by the dotted lines that delineate borders between adjacent slices. Consequently, point 102 and 252 are located in one slice whereas point 254 is located in another slice.

For example, in an embodiment, a projective hash map 230 for the projection surface 110 can be divided into eight slices, with each slice representing a different range of the extent of the dimension d for all points in the world space. In one embodiment, the processor 220 can be configured to split the first step into a multi-pass process. In the first pass, the processor 220 reads all of the 3D coordinates 202 corresponding to the points in the world space to determine a minimum and a maximum value of the dimension d for the plurality of points. In the second pass, the processor 202 can calculate the projected coordinates, as described above, but can also calculate a slice index based on the dimension d and the range of dimension d (max_d−min_d+ε, where ε is some small amount so the ratio below is never equal to 1) for the set of points. For example, if the projective hash map 230 is divided into n slices, then the slice index for a particular point is equal to the floor of the product of a number of slices and the ratio of dimension d minus minimum d in the range divided by the range of the dimension d, as shown below:

$$SI = \text{floor}\left(n \cdot \frac{d - \min\_d}{\text{range\_d}}\right) \quad \text{(Eq. 1)}$$

It will be appreciated that Eq. 1 is a simple solution that equally divides the range of the distance dimension into a number of equal subdivisions, with each division of the range corresponding to a particular slice of the projective hash map. Further, as described herein, a slice of the projective hash map refers to a copy of the data structure format for a single projective hash map that stores different subsets of data related to different subsets of points based on the dimension d. In some embodiments, the range can be set without knowing the distribution of points in the world space by setting the min_d equal to 0 and the max_d equal to a maximum potential distance of a point based on the extents of the world space and/or the location of the virtual camera within the world space.

In other embodiments, the algorithm for determining the slice index can be more complicated, such as dividing the range of the dimension d into unequal slices. For example, slices closer to the virtual camera 112 can be smaller (i.e., correspond to a smaller range of dimension d) than slices further away from the virtual camera 112. In one embodiment, the size of each slice increases by the power of two as d increases. In other words, the first slice index represents a base range of d, where each successive slice index represents twice the range of d as the previous slice index, as calculated according to the following:

$$SI = \text{floor}\left(\log_2\left(1 + 2^{num\_slices} - 1\right)\frac{d - \min\_d}{\text{range\_d}}\right)\right) \quad \text{(Eq. 2)}$$

In the example of Eq. 2 above, given a projective hash map 230 divided into four slices, a first slice (slice index 0) will correspond to a portion of approximately $\frac{1}{15}$ of the range of d, a second slice (slice index 1) will correspond to a portion of approximately $\frac{2}{15}$ of the range of d, a third slice (slice index 2) will correspond to a portion of approximately $\frac{4}{15}$ of the range of d, and a fourth slice (slice index 3) will correspond to a portion of approximately $\frac{8}{15}$ of the range of d. It will be appreciated that an unequal division of the range of dimension d can be beneficial where the point data may have a distribution of points concentrated closer to the virtual camera 112 such that points distributed in a foreground of the image are associated with a lower slice index.

The benefits of dividing a projective hash map into slices, as described above, is that a search for neighboring points to a given point can be limited to a small number of slices (e.g., the slice index corresponding to the query point and, optionally, adjacent slice indices to the slice index corresponding to the query point). Depending on the number of slices, this can significantly decrease the number of returned points to evaluate as potential neighboring points and limit the complexity of the search query to O(N^2) rather than O(N^3), which is still a vast improvement on conventional spatial hashing that may require an exhaustive search of all non-empty cells of the spatial hash map.

It will also be appreciated that the slice index can be adapted to divide the world space into different subsets based on a dimension other than the depth. For example, a slice can be defined based on the degree of angular offset of a projected ray for a point compared to a surface normal of the projection surface (or any other vector). The boundaries of such slices could be described as a series of concentric cones where the angular slope of the cone is increasing the as the projected coordinates for a ray move away from the center of the projection surface. While such slices might not be as useful for querying the projective hash map for a nearest neighbor for a query point, these alternative slices could be useful in other applications that could benefit from a different division of the world space to accelerate queries.

Figure 3A:
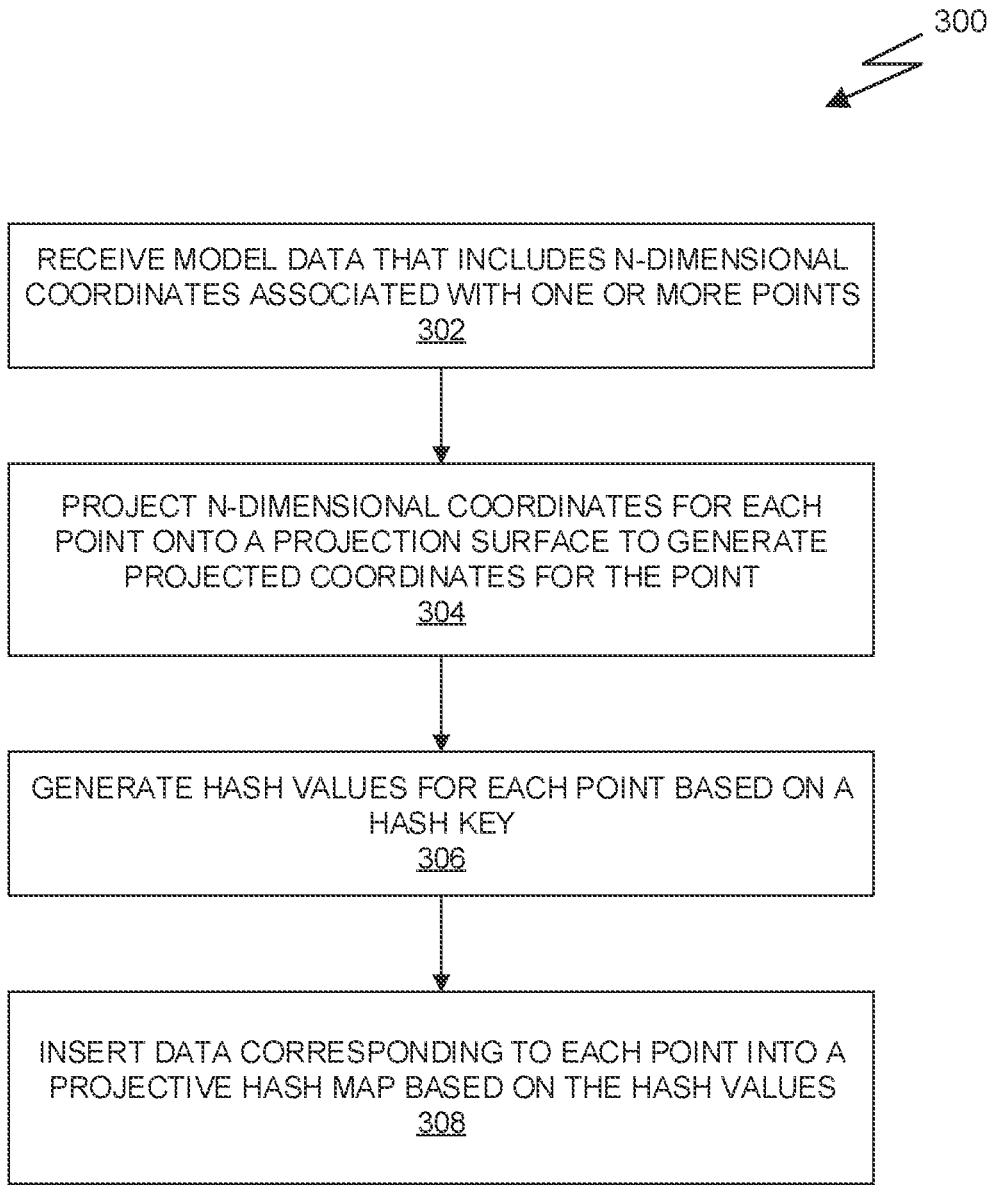
FIG. 3A illustrates a flowchart of a method for generating a projective hash map, in accordance with an embodiment.

FIG. 3A illustrates a flowchart of a method 300 for generating a projective hash map, in accordance with an embodiment. Each block (step) of method 300, described herein, comprises a computing process that may be performed using any combination of hardware, firmware, and/or software. For instance, various functions may be carried out by a processor executing instructions stored in memory.

The method may also be embodied as computer-usable instructions stored on computer storage media. The method may be provided by a standalone application, a service or hosted service (standalone or in combination with another hosted service), or a plug-in to another product, to name a few potential implementations. In addition, method 300 is described, by way of example, with respect to the system of FIG. 2A. However, this method may additionally or alternatively be executed by any one system, or any combination of systems, including, but not limited to, those described herein. Furthermore, persons of ordinary skill in the art will understand that any system that performs method 300 is within the scope and spirit of embodiments of the present disclosure.

At step 302, model data is received. In an embodiment, the model data includes N-dimensional coordinates for one or more points in an N-dimensional space as well as data associated with the points. In some embodiments, the N-dimensional space is a 3D space. In some cases, the data associated with each point can include the 3D coordinates for the point. In an embodiment, the model data is stored in a memory, including a volatile memory such as DRAM or a non-volatile memory such as flash memory, a HDD, or a SSD. In some embodiments, the model data is generated by an application such as a graphics application, game application, or the like. For example, the model data can comprise geometry data associated with the rendering of frames for a video game application. In other embodiments, the model data can comprise point cloud data. In some embodiments, the model data can be received from a processor of a local device. In other embodiments, the model data can be received from a remote device, such as data received at a client device, from a server device, via a network.

At step 304, N-dimensional coordinates for each point are projected onto a projection surface to generate corresponding projected coordinates. In an embodiment, the projection surface comprises a particular projection surface of one or more projection surfaces. The projection surface(s) may be associated with a virtual camera, where the location of the virtual camera defines the projection function. In an embodiment, the projected coordinates can be identified by calculating an intersection point of the projection surface and a ray connected between the 3D coordinates for the point and 3D coordinates associated with the virtual camera. In one embodiment, the projection surface is one of six projection surfaces forming a cube or prism that defines a volume that includes the location of the virtual camera. In one embodiment, one of the projection surfaces is sized to match a view plane associated with a rendered image of the model data, generated using a rendering algorithm, as described in more detail below. In other embodiments, the projection surface is a spherical projection surface and the projected coordinates comprise spherical coordinates.

At step 306, a hash value is generated for each point using a hash key. In an embodiment, the hash key includes the projected coordinates and is processed by a hash function, such as MD5 or SHA-256, to generate a hash value. In another embodiment, the hash key includes the projected coordinates as well as one or more additional values such as a LOD indicator, a surface index, or a slice index. It will be appreciated that the LOD indicator, surface index, and/or slice index can be combined in the same hash key to utilize, for example, both multiple LOD and slice functionality described above in a single projective hash map.

At step 308, data corresponding to each point is inserted into the projective hash map based on the corresponding hash value. The projective hash map is a data structure that stores key-value pairs, where the keys are the hash value for a point and the values are the corresponding data associated with the point. In some embodiments, each key is associated with a single entry (i.e., no collisions are allowed). In other embodiments, each key is associated with one or more entries, where the value associated with a key is a pointer to a separate data structure that stores the data associated with multiple 3D coordinates that hashed to the same key (i.e., collisions are allowed). In some embodiments, the hash value can be truncated, such as by taking a subset of bits of the hash value to use as the index into the projective hash map. For example, the 16 most significant bits of the 256-bit hash value generated by the SHA-256 hash function can be used as the index into the projective hash map, which includes 2^16 distinct slots for storing data.

The method 300 can be utilized by an application to construct a projective hash map from a set of model data (e.g., geometry data, point cloud data). Once the projective hash map is constructed, a subsequent operation can query the projective hash map to make certain operations more efficient. For example, the path space filtering example mentioned in the background section may be improved by using a projective hash map rather than a conventional hash map using 3D coordinates as a hash key.

Figure 3B:
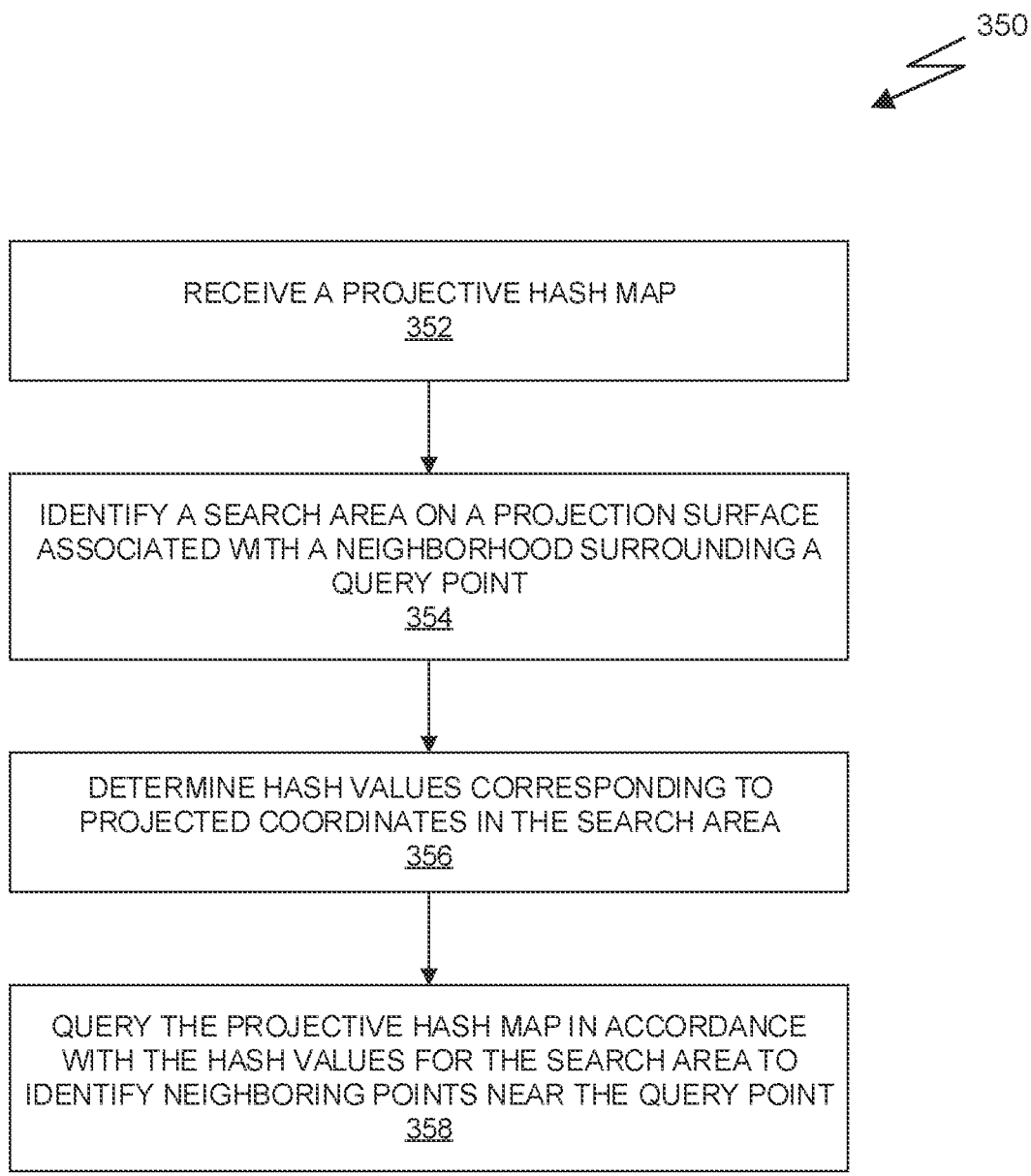
FIG. 3B illustrates a flowchart of a method for querying a projective hash map to find neighboring points, in accordance with an embodiment.

FIG. 3B illustrates a flowchart of a method 350 for querying a projective hash map to find neighboring points, in accordance with an embodiment. Each block (step) of method 350, described herein, comprises a computing process that may be performed using any combination of hardware, firmware, and/or software. For instance, various functions may be carried out by a processor executing instructions stored in memory. The method may also be embodied as computer-usable instructions stored on computer storage media. The method may be provided by a standalone application, a service or hosted service (standalone or in combination with another hosted service), or a plug-in to another product, to name a few potential implementations. In addition, method 350 is described, by way of example, with respect to the system of FIG. 2A. More specifically, the processor 220 can query the projective hash map to find points stored in the projective hash map within a local region of a query point. However, this method may additionally or alternatively be executed by any one system, or any combination of systems, including, but not limited to, those described herein. Furthermore, persons of ordinary skill in the art will understand that any system that performs method 350 is within the scope and spirit of embodiments of the present disclosure.

At step 352, a projective hash map is received. In an embodiment, the projective hash map is generated in a manner such as described in method 300 of FIG. 3A. In another embodiment, the projective hash map can be received via a network and stored in a memory associated with a processor. In other words, the projective hash map can be generated by another system and transmitted to a local system to be queried.

At step 354, a search area on a projective surface is identified. The size of the search area can be defined based on a size of the neighborhood surrounding a query point that should be searched. In one embodiment, the search area represents a subset of the projection surface that includes the projected coordinates associated with the query point. For example, if the query point associated with the 3D coordinates $<x_0, y_0, z_0>$ has projected coordinates of $<u_0, v_0>$ on the projection surface, then the search area can encompass all points on the projection surface associated with projected coordinates $<u, v>$ within the range $[u_0-\Delta u, u_0+\Delta u]$, $[v_0-\Delta v, v_0+\Delta v]$.

In some embodiments, the search area can wrap over the edge of the projection surface and extend into another projection surface. For example, using the cube structure shown in FIG. 1B, if the query point is projected close to an edge of the projection surface, then the search area may wrap around the edge of the cube to the adjacent projection surface. In such cases, the search area can include a first portion of the search area on a first projection surface and a second portion of the search area on a second projection surface.

At step 356, hash values corresponding to the projected coordinates in the search area are determined. In an embodiment, an exhaustive search is performed for all distinct projected coordinates in the search area. In other words, all cells on the projection surface with distinct projected coordinates in the search area are determined by, e.g., incrementing each possible value of the projected coordinates by the smallest possible amount (e.g., 1 for integers, or a fraction with fixed point values). In other embodiments, a subset of projected coordinates within the search area are converted to hash values. For example, a grid of points within the search area that represents a sample of unique projected coordinates can be searched. In other embodiments, points along a search path within the search area can be searched (e.g., horizontal, vertical, and diagonal lines within the search area that pass through or adjacent to the projected coordinates for the query point). While searching only a portion of the search area is not guaranteed to find all neighboring points to the query point, it can speed up the search algorithm significantly while providing a high likelihood of finding neighboring points. In some cases, a faster algorithm that provides a likelihood of success can be a bigger benefit than a slow algorithm that ensures success.

In an embodiment, multiple hash values can be considered for projected coordinates in the search area. For example, the projected coordinates can be combined with different values for a slice index and/or a LOD indicator to generate different hash keys for the same projected coordinates.

In some embodiments, where the search area comprises areas on two or more projection surfaces, then the hash values associated with the search area will be generated using hash keys that have a corresponding surface index value that matches the projection surface corresponding to the projected coordinates in that portion of the search area. It will be appreciated that being able to search across the edge of the cube (or prism) defined as the set of projection surfaces can be useful in certain graphics applications, such as in a graphics application that jitters sample positions associated with one or more rays in order to reduce image artifacts associated with discrete sampling.

At step 358, the projective hash map is queried using the hash values identified for the search area to identify neighboring points near the query point. In an embodiment, any returned point from the projective hash map is evaluated to determine a distance between the N-dimensional coordinates for the returned point and the N-Dimensional coordinates for the query point. If the distance between the points is greater than a threshold value, then the returned point is discarded, otherwise, the returned point is identified as a neighboring point of the query point.

It will be appreciated that, in some embodiments, a graphics application for rendering images for display can be configured to utilize projective hash maps for various operations. In a first operation, the graphics application can be configured to build the projective hash map using model data, as described in method 300. In a second operation, the graphics application can then use the projective hash map to accelerate certain operations. In some embodiments, the graphics application comprises a rendering algorithm that relies on ray-tracing to generate image data for display. For example, a projective hash map can be used to find all geometry in a scene that is close to a light source in order to calculate illumination values of objects based on a reflectance model for the light from the light source. Nothing in this disclosure should be construed as limiting projective hash maps to rendering applications as any algorithm that can utilize the projective hash map to accelerate an operation based on spatial queries is within the scope of the present disclosure.

Various examples of the use of projective hash maps are now described. In one example application, one or more projective hash maps could be deployed in a cloud gaming architecture, where points are added to the projective hash map(s) according to the input from multiple users (players) connected to a server hosting the game. Thus, the different users moving throughout the same virtual world in different locations can generate different sets of points that are added to a common projective hash map. Such an implementation is effectively a collaborative way to amortize the cost of computation and storage across a large number of users.

As another example application, a projective hash map could be utilized to store light maps for a scene. In such cases, a set of projective hash maps could be pre-filled at a number of locations in the scene, thereby storing lighting information for a number of points of surfaces projected onto the projection surface. Scenes can then be rendered by finding a hash value (i.e., a projected coordinate based on an origin of the projective hash map) for a point in the scene and looking up the lighting information nearest to that point from the projective hash map. In other words, the projected coordinate of that point is then used as a query point to search the projective hash map to find all lighting information that may be close to that point. It will be appreciated that the returned lighting information from the query may need to be culled to find the closest lighting information to the point. However, this technique benefits by not requiring a two-dimensional texture coordinate to perform a texture map lookup and can reduce distortion problems that arise from applying a two-dimensional texture map to a complex three-dimensional surface.

In yet another example, the projective hash maps can be utilized in autonomous vehicle applications or robotics systems that use sensors like LiDAR to reconstruct a version of the world around the vehicle or robot. Such information can be used in various processes such as collision avoidance and navigation algorithms.

More illustrative information will now be set forth regarding various optional architectures and features with which the foregoing framework may be implemented, per the desires of the user. It should be strongly noted that the following information is set forth for illustrative purposes and should not be construed as limiting in any manner. Any of the following features may be optionally incorporated with or without the exclusion of other features described.

It should be understood that the aforementioned embodiments and other arrangements described herein are set forth only as examples. Other arrangements and/or elements (e.g., machines, interfaces, functions, orders, groupings of functions, etc.) may be used in addition to or instead of those shown, and some elements may be omitted altogether.

Further, many of the elements described herein are functional entities that may be implemented as discrete or distributed components or in conjunction with other components, and in any suitable combination and location. Various functions described herein as being performed by entities may be carried out by hardware, firmware, and/or software. For instance, various functions may be carried out by a processor executing instructions stored in memory. Furthermore, persons of ordinary skill in the art will understand that any system that performs the operations described herein is within the scope and spirit of embodiments of the present disclosure.

Parallel Processing Architecture

Figure 4:
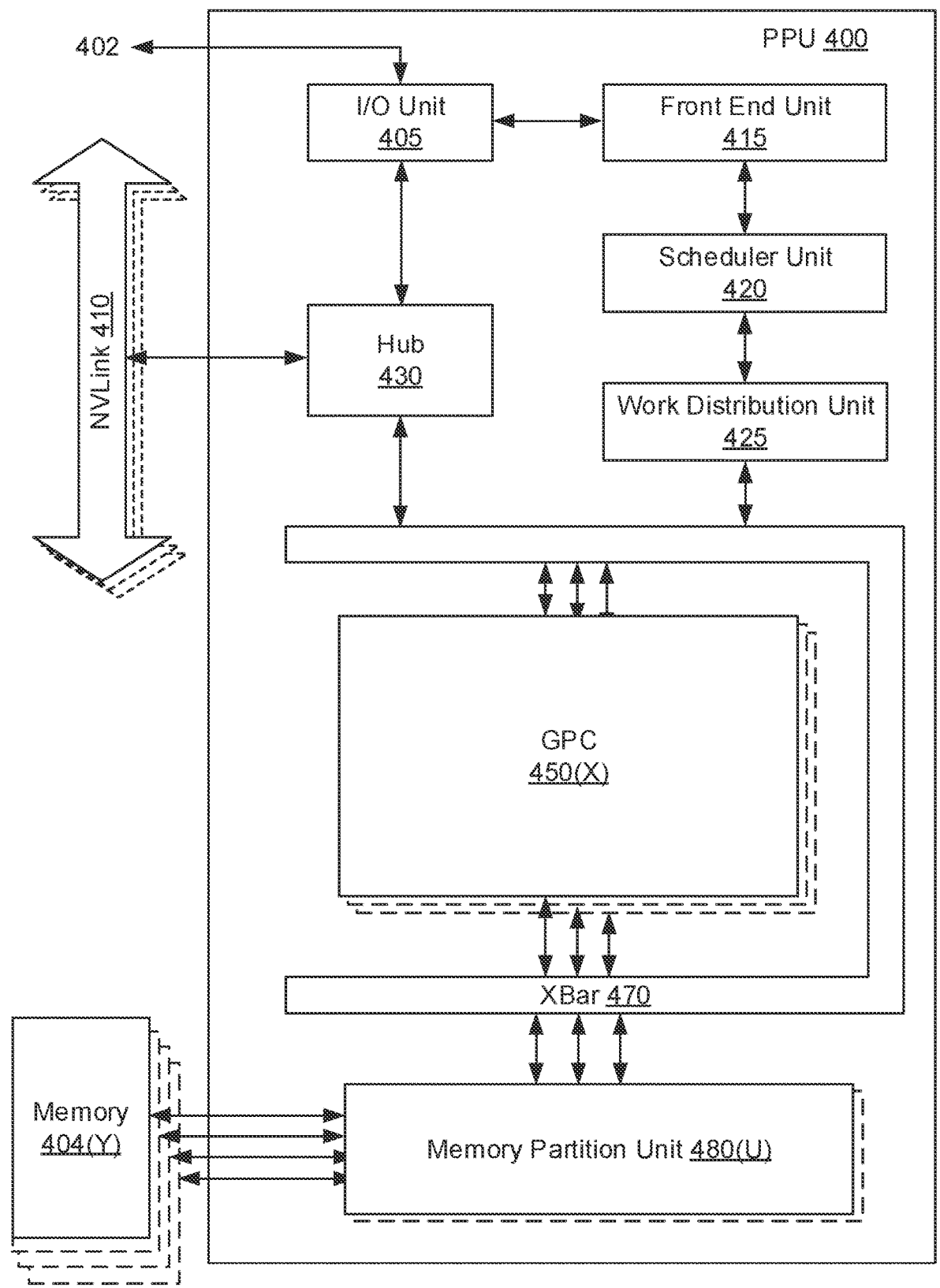
FIG. 4 illustrates an example parallel processing unit suitable for use in implementing some embodiments of the present disclosure.

FIG. 4 illustrates a parallel processing unit (PPU) 400, in accordance with an embodiment. In some embodiments, the PPU 400 may be included in the system 200, such as the processor 220 or as a co-processor to a host CPU. The PPU 400 may be used to implement one or more of the functions described above, such as the steps of the methods 300 or 350.

In an embodiment, the PPU 400 is a multi-threaded processor that is implemented on one or more integrated circuit devices. The PPU 400 is a latency hiding architecture designed to process many threads in parallel. A thread (e.g., a thread of execution) is an instantiation of a set of instructions configured to be executed by the PPU 400. In an embodiment, the PPU 400 is a graphics processing unit (GPU) configured to implement a graphics rendering pipeline for processing three-dimensional (3D) graphics data in order to generate two-dimensional (2D) image data for display on a display device. In other embodiments, the PPU 400 may be utilized for performing general-purpose computations. While one exemplary parallel processor is provided herein for illustrative purposes, it should be strongly noted that such processor is set forth for illustrative purposes only, and that any processor may be employed to supplement and/or substitute for the same.

One or more PPUs 400 may be configured to accelerate thousands of High Performance Computing (HPC), data center, cloud computing, and machine learning applications. The PPU 400 may be configured to accelerate numerous deep learning systems and applications for autonomous vehicles, simulation, computational graphics such as ray or path tracing, deep learning, high-accuracy speech, image, and text recognition systems, intelligent video analytics, molecular simulations, drug discovery, disease diagnosis, weather forecasting, big data analytics, astronomy, molecular dynamics simulation, financial modeling, robotics, factory automation, real-time language translation, online search optimizations, and personalized user recommendations, and the like.

As shown in FIG. 4, the PPU 400 includes an Input/Output (I/O) unit 405, a front end unit 415, a scheduler unit 420, a work distribution unit 425, a hub 430, a crossbar (Xbar) 470, one or more general processing clusters (GPCs) 450, and one or more memory partition units 480. The PPU 400 may be connected to a host processor or other PPUs 400 via one or more high-speed NVLink 410 interconnect. The PPU 400 may be connected to a host processor or other peripheral devices via an interconnect 402. The PPU 400 may also be connected to a local memory 404 comprising a number of memory devices. In an embodiment, the local memory may comprise a number of dynamic random access memory (DRAM) devices. The DRAM devices may be configured as a high-bandwidth memory (HBM) subsystem, with multiple DRAM dies stacked within each device.

The NVLink 410 interconnect enables systems to scale and include one or more PPUs 400 combined with one or more CPUs, supports cache coherence between the PPUs 400 and CPUs, and CPU mastering. Data and/or commands may be transmitted by the NVLink 410 through the hub 430 to/from other units of the PPU 400 such as one or more copy engines, a video encoder, a video decoder, a power management unit, etc. (not explicitly shown). The NVLink 410 is described in more detail in conjunction with FIG. 5B.

The I/O unit 405 is configured to transmit and receive communications (e.g., commands, data, etc.) from a host processor (not shown) over the interconnect 402. The I/O unit 405 may communicate with the host processor directly via the interconnect 402 or through one or more intermediate devices such as a memory bridge. In an embodiment, the I/O unit 405 may communicate with one or more other processors, such as one or more the PPUs 400 via the interconnect 402. In an embodiment, the I/O unit 405 implements a Peripheral Component Interconnect Express (PCIe) interface for communications over a PCIe bus and the interconnect 402 is a PCIe bus. In alternative embodiments, the I/O unit 405 may implement other types of well-known interfaces for communicating with external devices.

The I/O unit 405 decodes packets received via the interconnect 402. In an embodiment, the packets represent commands configured to cause the PPU 400 to perform various operations. The I/O unit 405 transmits the decoded commands to various other units of the PPU 400 as the commands may specify. For example, some commands may be transmitted to the front end unit 415. Other commands may be transmitted to the hub 430 or other units of the PPU 400 such as one or more copy engines, a video encoder, a video decoder, a power management unit, etc. (not explicitly shown). In other words, the I/O unit 405 is configured to route communications between and among the various logical units of the PPU 400.

In an embodiment, a program executed by the host processor encodes a command stream in a buffer that provides workloads to the PPU 400 for processing. A workload may comprise several instructions and data to be processed by those instructions. The buffer is a region in a memory that is accessible (e.g., read/write) by both the host processor and the PPU 400. For example, the I/O unit 405 may be configured to access the buffer in a system memory connected to the interconnect 402 via memory requests transmitted over the interconnect 402. In an embodiment, the host processor writes the command stream to the buffer and then transmits a pointer to the start of the command stream to the PPU 400. The front end unit 415 receives pointers to one or more command streams. The front end unit 415 manages the one or more streams, reading commands from the streams and forwarding commands to the various units of the PPU 400.

The front end unit 415 is coupled to a scheduler unit 420 that configures the various GPCs 450 to process tasks defined by the one or more streams. The scheduler unit 420 is configured to track state information related to the various tasks managed by the scheduler unit 420. The state may indicate which GPC 450 a task is assigned to, whether the task is active or inactive, a priority level associated with the task, and so forth. The scheduler unit 420 manages the execution of a plurality of tasks on the one or more GPCs 450.

The scheduler unit 420 is coupled to a work distribution unit 425 that is configured to dispatch tasks for execution on the GPCs 450. The work distribution unit 425 may track a number of scheduled tasks received from the scheduler unit 420. In an embodiment, the work distribution unit 425 manages a pending task pool and an active task pool for each of the GPCs 450. As a GPC 450 finishes the execution of a task, that task is evicted from the active task pool for the GPC 450 and one of the other tasks from the pending task pool is selected and scheduled for execution on the GPC 450. If an active task has been idle on the GPC 450, such as while waiting for a data dependency to be resolved, then the active task may be evicted from the GPC 450 and returned to the pending task pool while another task in the pending task pool is selected and scheduled for execution on the GPC 450.

In an embodiment, a host processor executes a driver kernel that implements an application programming interface (API) that enables one or more applications executing on the host processor to schedule operations for execution on the PPU 400. In an embodiment, multiple compute applications are simultaneously executed by the PPU 400 and the PPU 400 provides isolation, quality of service (QoS), and independent address spaces for the multiple compute applications. An application may generate instructions (e.g., API calls) that cause the driver kernel to generate one or more tasks for execution by the PPU 400. The driver kernel outputs tasks to one or more streams being processed by the PPU 400. Each task may comprise one or more groups of related threads, referred to herein as a warp. In an embodiment, a warp comprises 32 related threads that may be executed in parallel. Cooperating threads may refer to a plurality of threads including instructions to perform the task and that may exchange data through shared memory. The tasks may be allocated to one or more processing units within a GPC 450 and instructions are scheduled for execution by at least one warp.

The work distribution unit 425 communicates with the one or more GPCs 450 via XBar 470. The XBar 470 is an interconnect network that couples many of the units of the PPU 400 to other units of the PPU 400. For example, the XBar 470 may be configured to couple the work distribution unit 425 to a particular GPC 450. Although not shown explicitly, one or more other units of the PPU 400 may also be connected to the XBar 470 via the hub 430.

The tasks are managed by the scheduler unit 420 and dispatched to a GPC 450 by the work distribution unit 425. The GPC 450 is configured to process the task and generate results. The results may be consumed by other tasks within the GPC 450, routed to a different GPC 450 via the XBar 470, or stored in the memory 404. The results can be written to the memory 404 via the memory partition units 480, which implement a memory interface for reading and writing data to/from the memory 404. The results can be transmitted to another PPU 400 or CPU via the NVLink 410. In an embodiment, the PPU 400 includes a number U of memory partition units 480 that is equal to the number of separate and distinct memory devices of the memory 404 coupled to the PPU 400. Each GPC 450 may include a memory management unit to provide translation of virtual addresses into physical addresses, memory protection, and arbitration of memory requests. In an embodiment, the memory management unit provides one or more translation lookaside buffers (TLBs) for performing translation of virtual addresses into physical addresses in the memory 404.

In an embodiment, the memory partition unit 480 includes a Raster Operations (ROP) unit, a level two (L2) cache, and a memory interface that is coupled to the memory 404. The memory interface may implement 32, 64, 128, 1024-bit data buses, or the like, for high-speed data transfer. The PPU 400 may be connected to up to Y memory devices, such as high bandwidth memory stacks or graphics double-data-rate, version 5, synchronous dynamic random access memory, or other types of persistent storage. In an embodiment, the memory interface implements an HBM2 memory interface and Y equals half U. In an embodiment, the HBM2 memory stacks are located on the same physical package as the PPU 400, providing substantial power and area savings compared with conventional GDDR5 SDRAM systems. In an embodiment, each HBM2 stack includes four memory dies and Y equals 4, with each HBM2 stack including two 128-bit channels per die for a total of 8 channels and a data bus width of 1024 bits.

In an embodiment, the memory 404 supports Single-Error Correcting Double-Error Detecting (SECDED) Error Correction Code (ECC) to protect data. ECC provides higher reliability for compute applications that are sensitive to data corruption. Reliability is especially important in large-scale cluster computing environments where PPUs 400 process very large datasets and/or run applications for extended periods.

In an embodiment, the PPU 400 implements a multi-level memory hierarchy. In an embodiment, the memory partition unit 480 supports a unified memory to provide a single unified virtual address space for CPU and PPU 400 memory, enabling data sharing between virtual memory systems. In an embodiment the frequency of accesses by a PPU 400 to memory located on other processors is traced to ensure that memory pages are moved to the physical memory of the PPU 400 that is accessing the pages more frequently. In an embodiment, the NVLink 410 supports address translation services allowing the PPU 400 to directly access a CPU's page tables and providing full access to CPU memory by the PPU 400.

In an embodiment, copy engines transfer data between multiple PPUs 400 or between PPUs 400 and CPUs. The copy engines can generate page faults for addresses that are not mapped into the page tables. The memory partition unit 480 can then service the page faults, mapping the addresses into the page table, after which the copy engine can perform the transfer. In a conventional system, memory is pinned (e.g., non-pageable) for multiple copy engine operations between multiple processors, substantially reducing the available memory. With hardware page faulting, addresses can be passed to the copy engines without worrying if the memory pages are resident, and the copy process is transparent.

Data from the memory 404 or other system memory may be fetched by the memory partition unit 480 and stored in the L2 cache 460, which is located on-chip and is shared between the various GPCs 450. As shown, each memory partition unit 480 includes a portion of the L2 cache associated with a corresponding memory 404. Lower level caches may then be implemented in various units within the GPCs 450. For example, each of the processing units within a GPC 450 may implement a level one (L1) cache. The L1 cache is private memory that is dedicated to a particular processing unit. The L2 cache 460 is coupled to the memory interface 470 and the XBar 470 and data from the L2 cache may be fetched and stored in each of the L1 caches for processing.

In an embodiment, the processing units within each GPC 450 implement a SIMD (Single-Instruction, Multiple-Data) architecture where each thread in a group of threads (e.g., a warp) is configured to process a different set of data based on the same set of instructions. All threads in the group of threads execute the same instructions. In another embodiment, the processing unit implements a SIMT (Single-Instruction, Multiple Thread) architecture where each thread in a group of threads is configured to process a different set of data based on the same set of instructions, but where individual threads in the group of threads are allowed to diverge during execution. In an embodiment, a program counter, call stack, and execution state is maintained for each warp, enabling concurrency between warps and serial execution within warps when threads within the warp diverge. In another embodiment, a program counter, call stack, and execution state is maintained for each individual thread, enabling equal concurrency between all threads, within and between warps. When execution state is maintained for each individual thread, threads executing the same instructions may be converged and executed in parallel for maximum efficiency.

Cooperative Groups is a programming model for organizing groups of communicating threads that allows developers to express the granularity at which threads are communicating, enabling the expression of richer, more efficient parallel decompositions. Cooperative launch APIs support synchronization amongst thread blocks for the execution of parallel algorithms. Conventional programming models provide a single, simple construct for synchronizing cooperating threads: a barrier across all threads of a thread block (e.g., the syncthreads( ) function). However, programmers would often like to define groups of threads at smaller than thread block granularities and synchronize within the defined groups to enable greater performance, design flexibility, and software reuse in the form of collective group-wide function interfaces.

Cooperative Groups enables programmers to define groups of threads explicitly at sub-block (e.g., as small as a single thread) and multi-block granularities, and to perform collective operations such as synchronization on the threads in a cooperative group. The programming model supports clean composition across software boundaries, so that libraries and utility functions can synchronize safely within their local context without having to make assumptions about convergence. Cooperative Groups primitives enable new patterns of cooperative parallelism, including producer-consumer parallelism, opportunistic parallelism, and global synchronization across an entire grid of thread blocks.

Each processing unit includes a large number (e.g., 128, etc.) of distinct processing cores (e.g., functional units) that may be fully-pipelined, single-precision, double-precision, and/or mixed precision and include a floating point arithmetic logic unit and an integer arithmetic logic unit. In an embodiment, the floating point arithmetic logic units implement the IEEE 754-2008 standard for floating point arithmetic. In an embodiment, the cores include 64 single-precision (32-bit) floating point cores, 64 integer cores, 32 double-precision (64-bit) floating point cores, and 8 tensor cores.

Tensor cores configured to perform matrix operations. In particular, the tensor cores are configured to perform deep learning matrix arithmetic, such as GEMM (matrix-matrix multiplication) for convolution operations during neural network training and inferencing. In an embodiment, each tensor core operates on a 4×4 matrix and performs a matrix multiply and accumulate operation $D=A\times B+C$, where A, B, C, and D are 4×4 matrices.

In an embodiment, the matrix multiply inputs A and B may be integer, fixed-point, or floating point matrices, while the accumulation matrices C and D may be integer, fixed-point, or floating point matrices of equal or higher bitwidths.

In an embodiment, tensor cores operate on one, four, or eight bit integer input data with 32-bit integer accumulation. The 8-bit integer matrix multiply requires 1024 operations and results in a full precision product that is then accumulated using 32-bit integer addition with the other intermediate products for a 8×8×16 matrix multiply. In an embodiment, tensor Cores operate on 16-bit floating point input data with 32-bit floating point accumulation. The 16-bit floating point multiply requires 64 operations and results in a full precision product that is then accumulated using 32-bit floating point addition with the other intermediate products for a 4×4×4 matrix multiply. In practice, Tensor Cores are used to perform much larger two-dimensional or higher dimensional matrix operations, built up from these smaller elements. An API, such as CUDA 9 C++ API, exposes specialized matrix load, matrix multiply and accumulate, and matrix store operations to efficiently use Tensor Cores from a CUDA-C++ program. At the CUDA level, the warp-level interface assumes 16×16 size matrices spanning all 32 threads of the warp.

Each processing unit may also comprise M special function units (SFUs) that perform special functions (e.g., attribute evaluation, reciprocal square root, and the like). In an embodiment, the SFUs may include a tree traversal unit configured to traverse a hierarchical tree data structure. In an embodiment, the SFUs may include texture unit configured to perform texture map filtering operations. In an embodiment, the texture units are configured to load texture maps (e.g., a 2D array of texels) from the memory 404 and sample the texture maps to produce sampled texture values for use in shader programs executed by the processing unit. In an embodiment, the texture maps are stored in shared memory that may comprise or include an L1 cache. The texture units implement texture operations such as filtering operations using mip-maps (e.g., texture maps of varying levels of detail). In an embodiment, each processing unit includes two texture units.

Each processing unit also comprises N load store units (LSUs) that implement load and store operations between the shared memory and the register file. Each processing unit includes an interconnect network that connects each of the cores to the register file and the LSU to the register file, shared memory. In an embodiment, the interconnect network is a crossbar that can be configured to connect any of the cores to any of the registers in the register file and connect the LSUs to the register file and memory locations in shared memory.

The shared memory is an array of on-chip memory that allows for data storage and communication between the processing units and between threads within a processing unit. In an embodiment, the shared memory comprises 128 KB of storage capacity and is in the path from each of the processing units to the memory partition unit 480. The shared memory can be used to cache reads and writes. One or more of the shared memory, L1 cache, L2 cache, and memory 404 are backing stores.

Combining data cache and shared memory functionality into a single memory block provides the best overall performance for both types of memory accesses. The capacity is usable as a cache by programs that do not use shared memory. For example, if shared memory is configured to use half of the capacity, texture and load/store operations can use the remaining capacity. Integration within the shared memory enables the shared memory to function as a high-throughput conduit for streaming data while simultaneously providing high-bandwidth and low-latency access to frequently reused data.

When configured for general purpose parallel computation, a simpler configuration can be used compared with graphics processing. Specifically, fixed function graphics processing units, are bypassed, creating a much simpler programming model. In the general purpose parallel computation configuration, the work distribution unit 425 assigns and distributes blocks of threads directly to the processing units within the GPCs 450. Threads execute the same program, using a unique thread ID in the calculation to ensure each thread generates unique results, using the processing unit(s) to execute the program and perform calculations, shared memory to communicate between threads, and the LSU to read and write global memory through the shared memory and the memory partition unit 480. When configured for general purpose parallel computation, the processing units can also write commands that the scheduler unit 420 can use to launch new work on the processing units.

The PPUs 400 may each include, and/or be configured to perform functions of, one or more processing cores and/or components thereof, such as Tensor Cores (TCs), Tensor Processing Units (TPUs), Pixel Visual Cores (PVCs), Ray Tracing (RT) Cores, Vision Processing Units (VPUs), Graphics Processing Clusters (GPCs), Texture Processing Clusters (TPCs), Streaming Multiprocessors (SMs), Tree Traversal Units (TTUs), Artificial Intelligence Accelerators (AIAs), Deep Learning Accelerators (DLAs), Arithmetic-Logic Units (ALUs), Application-Specific Integrated Circuits (ASICs), Floating Point Units (FPUs), input/output (I/O) elements, peripheral component interconnect (PCI) or peripheral component interconnect express (PCIe) elements, and/or the like.

The PPU 400 may be included in a desktop computer, a laptop computer, a tablet computer, servers, supercomputers, a smart-phone (e.g., a wireless, hand-held device), personal digital assistant (PDA), a digital camera, a vehicle, a head mounted display, a hand-held electronic device, and the like. In an embodiment, the PPU 400 is embodied on a single semiconductor substrate. In another embodiment, the PPU 400 is included in a system-on-a-chip (SoC) along with one or more other devices such as additional PPUs 400, the memory 404, a reduced instruction set computer (RISC) CPU, a memory management unit (MMU), a digital-to-analog converter (DAC), and the like.

In an embodiment, the PPU 400 may be included on a graphics card that includes one or more memory devices. The graphics card may be configured to interface with a PCIe slot on a motherboard of a desktop computer. In yet another embodiment, the PPU 400 may be an integrated graphics processing unit (iGPU) or parallel processor included in the chipset of the motherboard. In yet another embodiment, the PPU 400 may be realized in reconfigurable hardware. In yet another embodiment, parts of the PPU 400 may be realized in reconfigurable hardware.

Exemplary Computing System

Systems with multiple GPUs and CPUs are used in a variety of industries as developers expose and leverage more parallelism in applications such as artificial intelligence computing. High-performance GPU-accelerated systems with tens to many thousands of compute nodes are deployed in data centers, research facilities, and supercomputers to solve ever larger problems. As the number of processing devices within the high-performance systems increases, the communication and data transfer mechanisms need to scale to support the increased bandwidth.

Figure 5A:
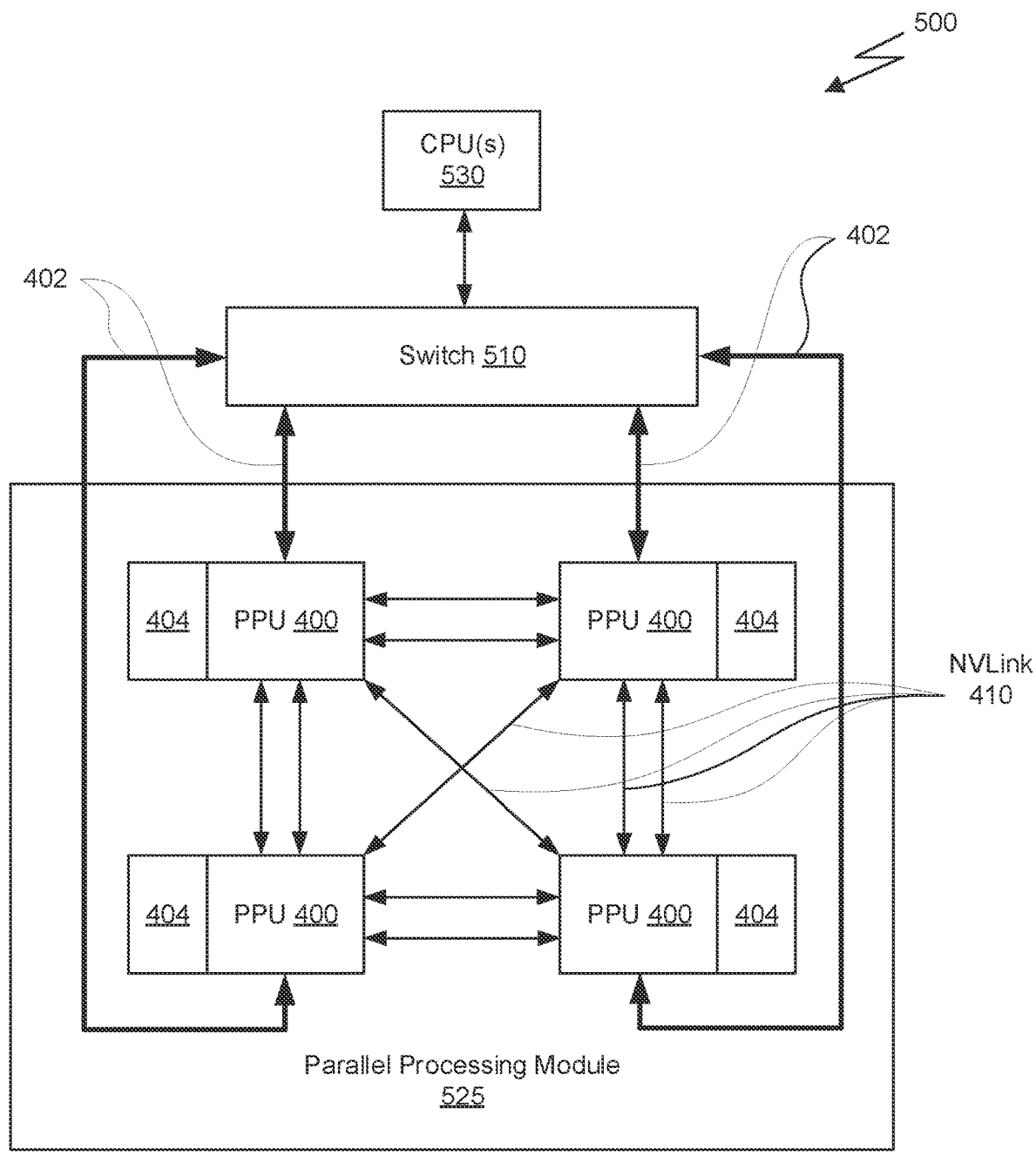
FIG. 5A is a conceptual diagram of a processing system implemented using the PPU of FIG. 4, suitable for use in implementing some embodiments of the present disclosure.

FIG. 5A is a conceptual diagram of a processing system 500 implemented using the PPU 400 of FIG. 4, in accordance with an embodiment. The exemplary system 565 may be configured to implement the method 300 shown in FIG. 3A and/or the method 350 shown in FIG. 3B. The processing system 500 includes a CPU 530, switch 510, and multiple PPUs 400, and respective memories 404.

Figure 5B:
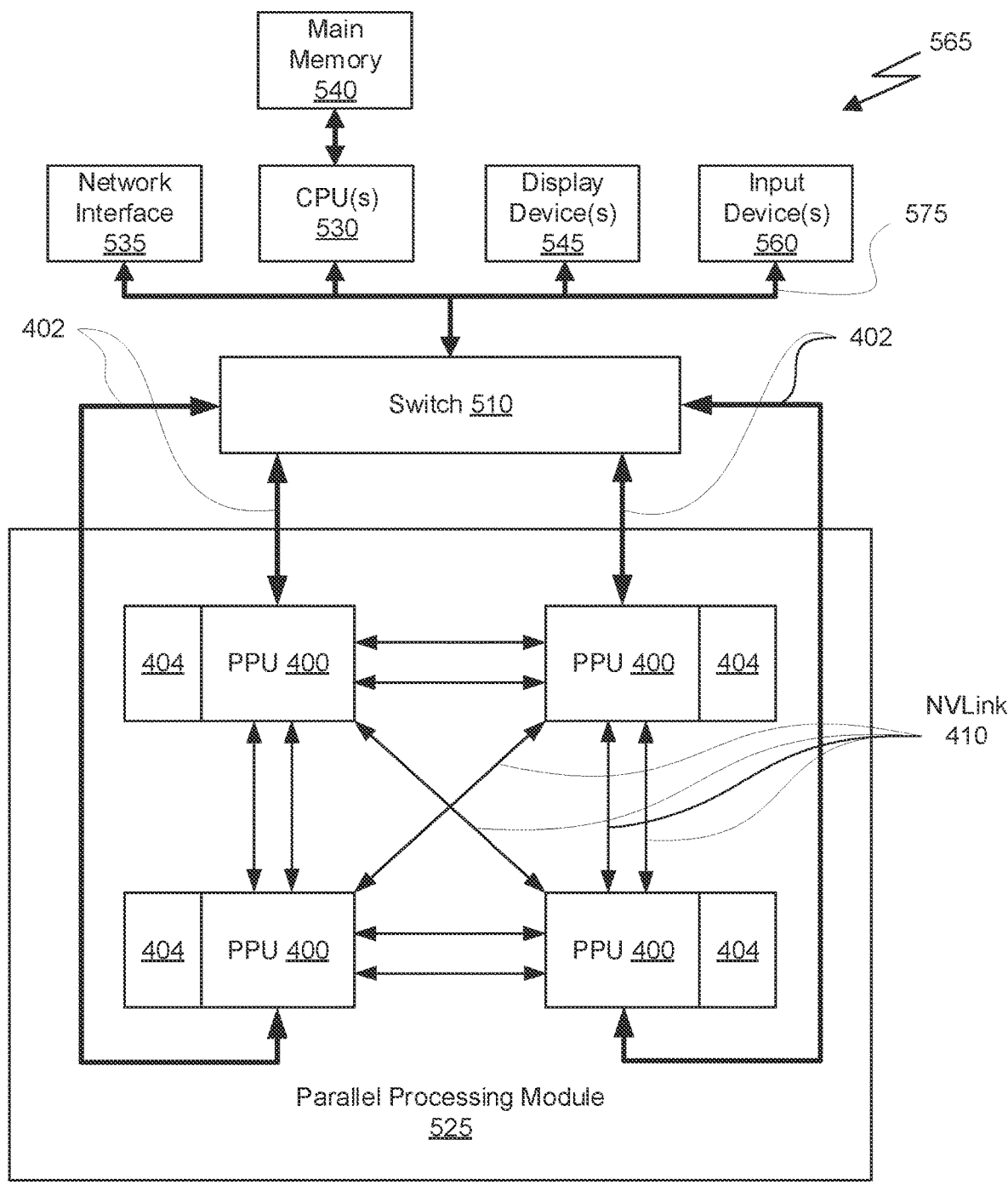
FIG. 5B illustrates an exemplary system in which the various architecture and/or functionality of the various previous embodiments may be implemented.

The NVLink 410 provides high-speed communication links between each of the PPUs 400. Although a particular number of NVLink 410 and interconnect 402 connections are illustrated in FIG. 5B, the number of connections to each PPU 400 and the CPU 530 may vary. The switch 510 interfaces between the interconnect 402 and the CPU 530. The PPUs 400, memories 404, and NVLinks 410 may be situated on a single semiconductor platform to form a parallel processing module 525. In an embodiment, the switch 510 supports two or more protocols to interface between various different connections and/or links.

In another embodiment (not shown), the NVLink 410 provides one or more high-speed communication links between each of the PPUs 400 and the CPU 530 and the switch 510 interfaces between the interconnect 402 and each of the PPUs 400. The PPUs 400, memories 404, and interconnect 402 may be situated on a single semiconductor platform to form a parallel processing module 525. In yet another embodiment (not shown), the interconnect 402 provides one or more communication links between each of the PPUs 400 and the CPU 530 and the switch 510 interfaces between each of the PPUs 400 using the NVLink 410 to provide one or more high-speed communication links between the PPUs 400. In another embodiment (not shown), the NVLink 410 provides one or more high-speed communication links between the PPUs 400 and the CPU 530 through the switch 510. In yet another embodiment (not shown), the interconnect 402 provides one or more communication links between each of the PPUs 400 directly. One or more of the NVLink 410 high-speed communication links may be implemented as a physical NVLink interconnect or either an on-chip or on-die interconnect using the same protocol as the NVLink 410.

In the context of the present description, a single semiconductor platform may refer to a sole unitary semiconductor-based integrated circuit fabricated on a die or chip. It should be noted that the term single semiconductor platform may also refer to multi-chip modules with increased connectivity which simulate on-chip operation and make substantial improvements over utilizing a conventional bus implementation. Of course, the various circuits or devices may also be situated separately or in various combinations of semiconductor platforms per the desires of the user. Alternately, the parallel processing module 525 may be implemented as a circuit board substrate and each of the PPUs 400 and/or memories 404 may be packaged devices. In an embodiment, the CPU 530, switch 510, and the parallel processing module 525 are situated on a single semiconductor platform.

In an embodiment, the signaling rate of each NVLink 410 is 20 to 25 Gigabits/second and each PPU 400 includes six NVLink 410 interfaces (as shown in FIG. 5A, five NVLink 410 interfaces are included for each PPU 400). Each NVLink 410 provides a data transfer rate of 25 Gigabytes/second in each direction, with six links providing 400 Gigabytes/second. The NVLinks 410 can be used exclusively for PPU-to-PPU communication as shown in FIG. 5A, or some combination of PPU-to-PPU and PPU-to-CPU, when the CPU 530 also includes one or more NVLink 410 interfaces.

In an embodiment, the NVLink 410 allows direct load/store/atomic access from the CPU 530 to each PPU's 400 memory 404. In an embodiment, the NVLink 410 supports coherency operations, allowing data read from the memories 404 to be stored in the cache hierarchy of the CPU 530, reducing cache access latency for the CPU 530. In an embodiment, the NVLink 410 includes support for Address Translation Services (ATS), allowing the PPU 400 to directly access page tables within the CPU 530. One or more of the NVLinks 410 may also be configured to operate in a low-power mode.

FIG. 5B illustrates an exemplary system 565 in which the various architecture and/or functionality of the various previous embodiments may be implemented. The exemplary system 565 may be configured to implement the method 300 shown in FIG. 3A and/or the method 350 shown in FIG. 3B.

As shown, a system 565 is provided including at least one central processing unit 530 that is connected to a communication bus 575. The communication bus 575 may directly or indirectly couple one or more of the following devices: main memory 540, network interface 535, CPU(s) 530, display device(s) 545, input device(s) 560, switch 510, and parallel processing system 525. The communication bus 575 may be implemented using any suitable protocol and may represent one or more links or busses, such as an address bus, a data bus, a control bus, or a combination thereof. The communication bus 575 may include one or more bus or link types, such as an industry standard architecture (ISA) bus, an extended industry standard architecture (EISA) bus, a video electronics standards association (VESA) bus, a peripheral component interconnect (PCI) bus, a peripheral component interconnect express (PCIe) bus, HyperTransport, and/or another type of bus or link. In some embodiments, there are direct connections between components. As an example, the CPU(s) 530 may be directly connected to the main memory 540. Further, the CPU(s) 530 may be directly connected to the parallel processing system 525. Where there is direct, or point-to-point connection between components, the communication bus 575 may include a PCIe link to carry out the connection. In these examples, a PCI bus need not be included in the system 565.

Figure 5C:
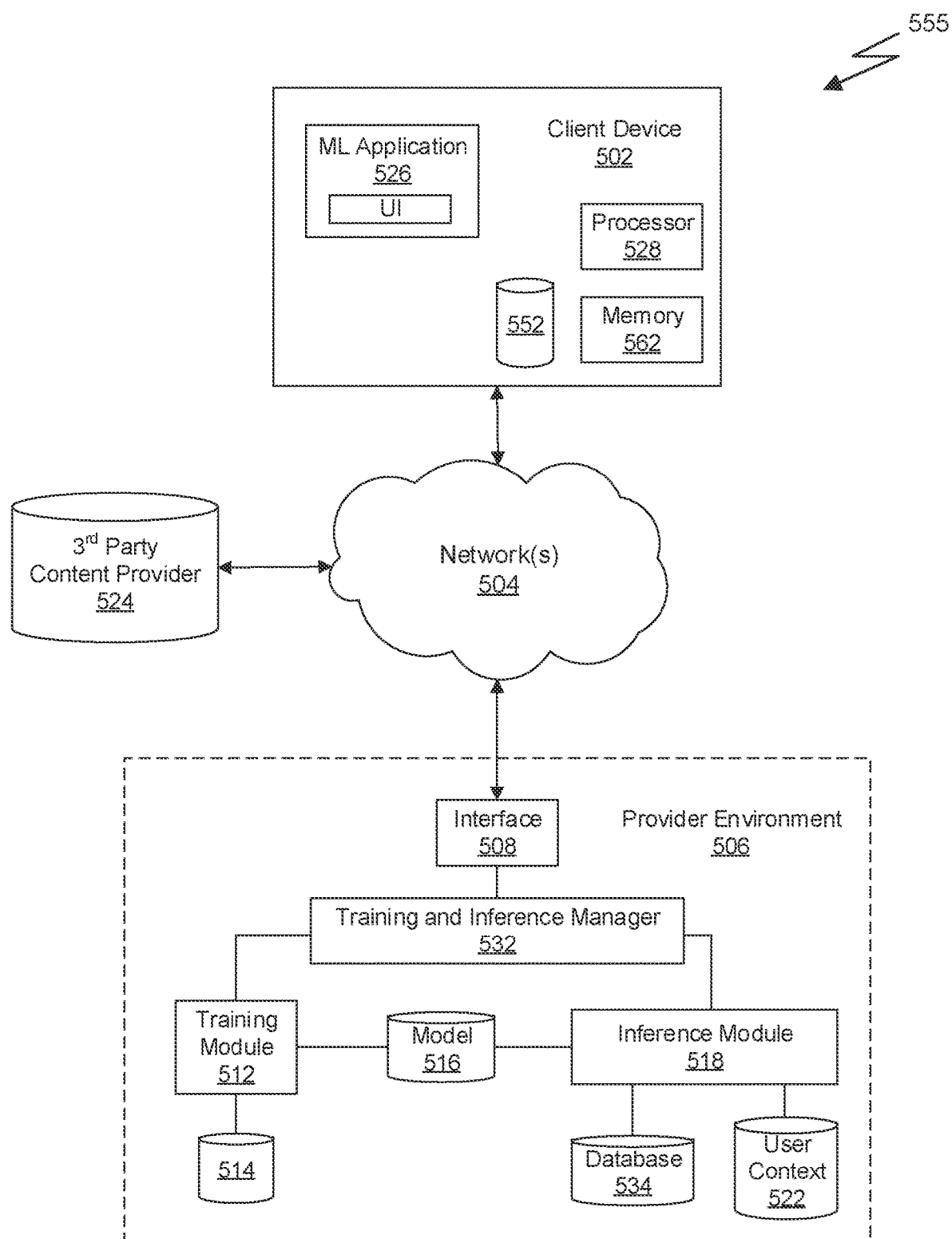
FIG. 5C illustrates components of an exemplary system that can be used to train and utilize machine learning, in at least one embodiment.

Although the various blocks of FIG. 5C are shown as connected via the communication bus 575 with lines, this is not intended to be limiting and is for clarity only. For example, in some embodiments, a presentation component, such as display device(s) 545, may be considered an I/O component, such as input device(s) 560 (e.g., if the display is a touch screen). As another example, the CPU(s) 530 and/or parallel processing system 525 may include memory (e.g., the main memory 540 may be representative of a storage device in addition to the parallel processing system 525, the CPUs 530, and/or other components). In other words, the computing device of FIG. 5C is merely illustrative. Distinction is not made between such categories as "workstation," "server," "laptop," "desktop," "tablet," "client device," "mobile device," "hand-held device," "game console," "electronic control unit (ECU)," "virtual reality system," and/or other device or system types, as all are contemplated within the scope of the computing device of FIG. 5C.

The system 565 also includes a main memory 540. Control logic (software) and data are stored in the main memory 540 which may take the form of a variety of computer-readable media. The computer-readable media may be any available media that may be accessed by the system 565. The computer-readable media may include both volatile and nonvolatile media, and removable and non-removable media. By way of example, and not limitation, the computer-readable media may comprise computer-storage media and communication media.

The computer-storage media may include both volatile and nonvolatile media and/or removable and non-removable media implemented in any method or technology for storage of information such as computer-readable instructions, data structures, program modules, and/or other data types. For example, the main memory 540 may store computer-readable instructions (e.g., that represent a program(s) and/or a program element(s), such as an operating system. Computer-storage media may include, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which may be used to store the desired information and which may be accessed by system 565. As used herein, computer storage media does not comprise signals per se.

The computer storage media may embody computer-readable instructions, data structures, program modules, and/or other data types in a modulated data signal such as a carrier wave or other transport mechanism and includes any information delivery media. The term "modulated data signal" may refer to a signal that has one or more of its characteristics set or changed in such a manner as to encode information in the signal. By way of example, and not limitation, the computer storage media may include wired media such as a wired network or direct-wired connection, and wireless media such as acoustic, RF, infrared and other wireless media. Combinations of any of the above should also be included within the scope of computer-readable media.

Computer programs, when executed, enable the system 565 to perform various functions. The CPU(s) 530 may be configured to execute at least some of the computer-readable instructions to control one or more components of the system 565 to perform one or more of the methods and/or processes described herein. The CPU(s) 530 may each include one or more cores (e.g., one, two, four, eight, twenty-eight, seventy-two, etc.) that are capable of handling a multitude of software threads simultaneously. The CPU(s) 530 may include any type of processor, and may include different types of processors depending on the type of system 565 implemented (e.g., processors with fewer cores for mobile devices and processors with more cores for servers). For example, depending on the type of system 565, the processor may be an Advanced RISC Machines (ARM) processor implemented using Reduced Instruction Set Computing (RISC) or an x86 processor implemented using Complex Instruction Set Computing (CISC). The system 565 may include one or more CPUs 530 in addition to one or more microprocessors or supplementary co-processors, such as math co-processors.

In addition to or alternatively from the CPU(s) 530, the parallel processing module 525 may be configured to execute at least some of the computer-readable instructions to control one or more components of the system 565 to perform one or more of the methods and/or processes described herein. The parallel processing module 525 may be used by the system 565 to render graphics (e.g., 3D graphics) or perform general purpose computations. For example, the parallel processing module 525 may be used for General-Purpose computing on GPUs (GPGPU). In embodiments, the CPU(s) 530 and/or the parallel processing module 525 may discretely or jointly perform any combination of the methods, processes and/or portions thereof.

The system 565 also includes input device(s) 560, the parallel processing system 525, and display device(s) 545. The display device(s) 545 may include a display (e.g., a monitor, a touch screen, a television screen, a heads-up-display (HUD), other display types, or a combination thereof), speakers, and/or other presentation components. The display device(s) 545 may receive data from other components (e.g., the parallel processing system 525, the CPU(s) 530, etc.), and output the data (e.g., as an image, video, sound, etc.).

The network interface 535 may enable the system 565 to be logically coupled to other devices including the input devices 560, the display device(s) 545, and/or other components, some of which may be built in to (e.g., integrated in) the system 565. Illustrative input devices 560 include a microphone, mouse, keyboard, joystick, game pad, game controller, satellite dish, scanner, printer, wireless device, etc. The input devices 560 may provide a natural user interface (NUI) that processes air gestures, voice, or other physiological inputs generated by a user. In some instances, inputs may be transmitted to an appropriate network element for further processing. An NUI may implement any combination of speech recognition, stylus recognition, facial recognition, biometric recognition, gesture recognition both on screen and adjacent to the screen, air gestures, head and eye tracking, and touch recognition (as described in more detail below) associated with a display of the system 565. The system 565 may be include depth cameras, such as stereoscopic camera systems, infrared camera systems, RGB camera systems, touchscreen technology, and combinations of these, for gesture detection and recognition. Additionally, the system 565 may include accelerometers or gyroscopes (e.g., as part of an inertia measurement unit (IMU)) that enable detection of motion. In some examples, the output of the accelerometers or gyroscopes may be used by the system 565 to render immersive augmented reality or virtual reality.

Further, the system 565 may be coupled to a network (e.g., a telecommunications network, local area network (LAN), wireless network, wide area network (WAN) such as the Internet, peer-to-peer network, cable network, or the like) through a network interface 535 for communication purposes. The system 565 may be included within a distributed network and/or cloud computing environment.

The network interface 535 may include one or more receivers, transmitters, and/or transceivers that enable the system 565 to communicate with other computing devices via an electronic communication network, included wired and/or wireless communications. The network interface 535 may include components and functionality to enable communication over any of a number of different networks, such as wireless networks (e.g., Wi-Fi, Z-Wave, Bluetooth, Bluetooth LE, ZigBee, etc.), wired networks (e.g., communicating over Ethernet or InfiniBand), low-power wide-area networks (e.g., LoRaWAN, SigFox, etc.), and/or the Internet.

The system 565 may also include a secondary storage (not shown). The secondary storage 610 includes, for example, a hard disk drive and/or a removable storage drive, representing a floppy disk drive, a magnetic tape drive, a compact disk drive, digital versatile disk (DVD) drive, recording device, universal serial bus (USB) flash memory. The removable storage drive reads from and/or writes to a removable storage unit in a well-known manner. The system 565 may also include a hard-wired power supply, a battery power supply, or a combination thereof (not shown). The power supply may provide power to the system 565 to enable the components of the system 565 to operate.

Each of the foregoing modules and/or devices may even be situated on a single semiconductor platform to form the system 565. Alternately, the various modules may also be situated separately or in various combinations of semiconductor platforms per the desires of the user. While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

Example Network Environments

Network environments suitable for use in implementing embodiments of the disclosure may include one or more client devices, servers, network attached storage (NAS), other backend devices, and/or other device types. The client devices, servers, and/or other device types (e.g., each device) may be implemented on one or more instances of the processing system 500 of FIG. 5A and/or exemplary system 565 of FIG. 5B—e.g., each device may include similar components, features, and/or functionality of the processing system 500 and/or exemplary system 565.

Components of a network environment may communicate with each other via a network(s), which may be wired, wireless, or both. The network may include multiple networks, or a network of networks. By way of example, the network may include one or more Wide Area Networks (WANs), one or more Local Area Networks (LANs), one or more public networks such as the Internet and/or a public switched telephone network (PSTN), and/or one or more private networks. Where the network includes a wireless telecommunications network, components such as a base station, a communications tower, or even access points (as well as other components) may provide wireless connectivity.

Compatible network environments may include one or more peer-to-peer network environments—in which case a server may not be included in a network environment—and one or more client-server network environments—in which case one or more servers may be included in a network environment. In peer-to-peer network environments, functionality described herein with respect to a server(s) may be implemented on any number of client devices.

In at least one embodiment, a network environment may include one or more cloud-based network environments, a distributed computing environment, a combination thereof, etc. A cloud-based network environment may include a framework layer, a job scheduler, a resource manager, and a distributed file system implemented on one or more of servers, which may include one or more core network servers and/or edge servers. A framework layer may include a framework to support software of a software layer and/or one or more application(s) of an application layer. The software or application(s) may respectively include web-based service software or applications. In embodiments, one or more of the client devices may use the web-based service software or applications (e.g., by accessing the service software and/or applications via one or more application programming interfaces (APIs)). The framework layer may be, but is not limited to, a type of free and open-source software web application framework such as that may use a distributed file system for large-scale data processing (e.g., "big data").

A cloud-based network environment may provide cloud computing and/or cloud storage that carries out any combination of computing and/or data storage functions described herein (or one or more portions thereof). Any of these various functions may be distributed over multiple locations from central or core servers (e.g., of one or more data centers that may be distributed across a state, a region, a country, the globe, etc.). If a connection to a user (e.g., a client device) is relatively close to an edge server(s), a core server(s) may designate at least a portion of the functionality to the edge server(s). A cloud-based network environment may be private (e.g., limited to a single organization), may be public (e.g., available to many organizations), and/or a combination thereof (e.g., a hybrid cloud environment).

The client device(s) may include at least some of the components, features, and functionality of the example processing system 500 of FIG. 5B and/or exemplary system 565 of FIG. 5C. By way of example and not limitation, a client device may be embodied as a Personal Computer (PC), a laptop computer, a mobile device, a smartphone, a tablet computer, a smart watch, a wearable computer, a Personal Digital Assistant (PDA), an MP3 player, a virtual reality headset, a Global Positioning System (GPS) or device, a video player, a video camera, a surveillance device or system, a vehicle, a boat, a flying vessel, a virtual machine, a drone, a robot, a handheld communications device, a hospital device, a gaming device or system, an entertainment system, a vehicle computer system, an embedded system controller, a remote control, an appliance, a consumer electronic device, a workstation, an edge device, any combination of these delineated devices, or any other suitable device.

Machine Learning

Deep neural networks (DNNs) developed on processors, such as the PPU 400 have been used for diverse use cases, from self-driving cars to faster drug development, from automatic image captioning in online image databases to smart real-time language translation in video chat applications. Deep learning is a technique that models the neural learning process of the human brain, continually learning, continually getting smarter, and delivering more accurate results more quickly over time. A child is initially taught by an adult to correctly identify and classify various shapes, eventually being able to identify shapes without any coaching. Similarly, a deep learning or neural learning system needs to be trained in object recognition and classification for it get smarter and more efficient at identifying basic objects, occluded objects, etc., while also assigning context to objects.

At the simplest level, neurons in the human brain look at various inputs that are received, importance levels are assigned to each of these inputs, and output is passed on to other neurons to act upon. An artificial neuron or perceptron is the most basic model of a neural network. In one example, a perceptron may receive one or more inputs that represent various features of an object that the perceptron is being trained to recognize and classify, and each of these features is assigned a certain weight based on the importance of that feature in defining the shape of an object.

A deep neural network (DNN) model includes multiple layers of many connected nodes (e.g., perceptrons, Boltzmann machines, radial basis functions, convolutional layers, etc.) that can be trained with enormous amounts of input data to quickly solve complex problems with high accuracy. In one example, a first layer of the DNN model breaks down an input image of an automobile into various sections and looks for basic patterns such as lines and angles. The second layer assembles the lines to look for higher level patterns such as wheels, windshields, and mirrors. The next layer identifies the type of vehicle, and the final few layers generate a label for the input image, identifying the model of a specific automobile brand.

Once the DNN is trained, the DNN can be deployed and used to identify and classify objects or patterns in a process known as inference. Examples of inference (the process through which a DNN extracts useful information from a given input) include identifying handwritten numbers on checks deposited into ATM machines, identifying images of friends in photos, delivering movie recommendations to over fifty million users, identifying and classifying different types of automobiles, pedestrians, and road hazards in driverless cars, or translating human speech in real-time.

During training, data flows through the DNN in a forward propagation phase until a prediction is produced that indicates a label corresponding to the input. If the neural network does not correctly label the input, then errors between the correct label and the predicted label are analyzed, and the weights are adjusted for each feature during a backward propagation phase until the DNN correctly labels the input and other inputs in a training dataset. Training complex neural networks requires massive amounts of parallel computing performance, including floating-point multiplications and additions that are supported by the PPU 400. Inferencing is less compute-intensive than training, being a latency-sensitive process where a trained neural network is applied to new inputs it has not seen before to classify images, detect emotions, identify recommendations, recognize and translate speech, and generally infer new information.

Neural networks rely heavily on matrix math operations, and complex multi-layered networks require tremendous amounts of floating-point performance and bandwidth for both efficiency and speed. With thousands of processing cores, optimized for matrix math operations, and delivering tens to hundreds of TFLOPS of performance, the PPU 400 is a computing platform capable of delivering performance required for deep neural network-based artificial intelligence and machine learning applications.

Furthermore, images generated applying one or more of the techniques disclosed herein may be used to train, test, or certify DNNs used to recognize objects and environments in the real world. Such images may include scenes of roadways, factories, buildings, urban settings, rural settings, humans, animals, and any other physical object or real-world setting. Such images may be used to train, test, or certify DNNs that are employed in machines or robots to manipulate, handle, or modify physical objects in the real world. Furthermore, such images may be used to train, test, or certify DNNs that are employed in autonomous vehicles to navigate and move the vehicles through the real world. Additionally, images generated applying one or more of the techniques disclosed herein may be used to convey information to users of such machines, robots, and vehicles.

FIG. 5C illustrates components of an exemplary system 555 that can be used to train and utilize machine learning, in accordance with at least one embodiment. As will be discussed, various components can be provided by various combinations of computing devices and resources, or a single computing system, which may be under control of a single entity or multiple entities. Further, aspects may be triggered, initiated, or requested by different entities. In at least one embodiment training of a neural network might be instructed by a provider associated with provider environment 506, while in at least one embodiment training might be requested by a customer or other user having access to a provider environment through a client device 502 or other such resource. In at least one embodiment, training data (or data to be analyzed by a trained neural network) can be provided by a provider, a user, or a third party content provider 524. In at least one embodiment, client device 502 may be a vehicle or object that is to be navigated on behalf of a user, for example, which can submit requests and/or receive instructions that assist in navigation of a device.

In at least one embodiment, requests are able to be submitted across at least one network 504 to be received by a provider environment 506. In at least one embodiment, a client device may be any appropriate electronic and/or computing devices enabling a user to generate and send such requests, such as, but not limited to, desktop computers, notebook computers, computer servers, smartphones, tablet computers, gaming consoles (portable or otherwise), computer processors, computing logic, and set-top boxes. Network(s) 504 can include any appropriate network for transmitting a request or other such data, as may include Internet, an intranet, an Ethernet, a cellular network, a local area network (LAN), a wide area network (WAN), a personal area network (PAN), an ad hoc network of direct wireless connections among peers, and so on.

In at least one embodiment, requests can be received at an interface layer 508, which can forward data to a training and inference manager 532, in this example. The training and inference manager 532 can be a system or service including hardware and software for managing requests and service corresponding data or content, in at least one embodiment, the training and inference manager 532 can receive a request to train a neural network, and can provide data for a request to a training module 512. In at least one embodiment, training module 512 can select an appropriate model or neural network to be used, if not specified by the request, and can train a model using relevant training data. In at least one embodiment, training data can be a batch of data stored in a training data repository 514, received from client device 502, or obtained from a third party provider 524. In at least one embodiment, training module 512 can be responsible for training data. A neural network can be any appropriate network, such as a recurrent neural network (RNN) or convolutional neural network (CNN). Once a neural network is trained and successfully evaluated, a trained neural network can be stored in a model repository 516, for example, that may store different models or networks for users, applications, or services, etc. In at least one embodiment, there may be multiple models for a single application or entity, as may be utilized based on a number of different factors.

In at least one embodiment, at a subsequent point in time, a request may be received from client device 502 (or another such device) for content (e.g., path determinations) or data that is at least partially determined or impacted by a trained neural network. This request can include, for example, input data to be processed using a neural network to obtain one or more inferences or other output values, classifications, or predictions, or for at least one embodiment, input data can be received by interface layer 508 and directed to inference module 518, although a different system or service can be used as well. In at least one embodiment, inference module 518 can obtain an appropriate trained network, such as a trained deep neural network (DNN) as discussed herein, from model repository 516 if not already stored locally to inference module 518. Inference module 518 can provide data as input to a trained network, which can then generate one or more inferences as output. This may include, for example, a classification of an instance of input data. In at least one embodiment, inferences can then be transmitted to client device 502 for display or other communication to a user. In at least one embodiment, context data for a user may also be stored to a user context data repository 522, which may include data about a user which may be useful as input to a network in generating inferences, or determining data to return to a user after obtaining instances. In at least one embodiment, relevant data, which may include at least some of input or inference data, may also be stored to a local database 534 for processing future requests. In at least one embodiment, a user can use account information or other information to access resources or functionality of a provider environment. In at least one embodiment, if permitted and available, user data may also be collected and used to further train models, in order to provide more accurate inferences for future requests. In at least one embodiment, requests may be received through a user interface to a machine learning application 526 executing on client device 502, and results displayed through a same interface. A client device can include resources such as a processor 528 and memory 562 for generating a request and processing results or a response, as well as at least one data storage element 552 for storing data for machine learning application 526.

In at least one embodiment a processor 528 (or a processor of training module 512 or inference module 518) will be a central processing unit (CPU). As mentioned, however, resources in such environments can utilize GPUs to process data for at least certain types of requests. With thousands of cores, GPUs, such as PPU 300 are designed to handle substantial parallel workloads and, therefore, have become popular in deep learning for training neural networks and generating predictions. While use of GPUs for offline builds has enabled faster training of larger and more complex models, generating predictions offline implies that either request-time input features cannot be used or predictions must be generated for all permutations of features and stored in a lookup table to serve real-time requests. If a deep learning framework supports a CPU-mode and a model is small and simple enough to perform a feed-forward on a CPU with a reasonable latency, then a service on a CPU instance could host a model. In this case, training can be done offline on a GPU and inference done in real-time on a CPU. If a CPU approach is not viable, then a service can run on a GPU instance. Because GPUs have different performance and cost characteristics than CPUs, however, running a service that offloads a runtime algorithm to a GPU can require it to be designed differently from a CPU based service.

In at least one embodiment, video data can be provided from client device 502 for enhancement in provider environment 506. In at least one embodiment, video data can be processed for enhancement on client device 502. In at least one embodiment, video data may be streamed from a third party content provider 524 and enhanced by third party content provider 524, provider environment 506, or client device 502. In at least one embodiment, video data can be provided from client device 502 for use as training data in provider environment 506.

In at least one embodiment, supervised and/or unsupervised training can be performed by the client device 502 and/or the provider environment 506. In at least one embodiment, a set of training data 514 (e.g., classified or labeled data) is provided as input to function as training data.

In at least one embodiment, training data can include instances of at least one type of object for which a neural network is to be trained, as well as information that identifies that type of object. In at least one embodiment, training data might include a set of images that each includes a representation of a type of object, where each image also includes, or is associated with, a label, metadata, classification, or other piece of information identifying a type of object represented in a respective image. Various other types of data may be used as training data as well, as may include text data, audio data, video data, and so on. In at least one embodiment, training data 514 is provided as training input to a training module 512. In at least one embodiment, training module 512 can be a system or service that includes hardware and software, such as one or more computing devices executing a training application, for training a neural network (or other model or algorithm, etc.). In at least one embodiment, training module 512 receives an instruction or request indicating a type of model to be used for training, in at least one embodiment, a model can be any appropriate statistical model, network, or algorithm useful for such purposes, as may include an artificial neural network, deep learning algorithm, learning classifier, Bayesian network, and so on. In at least one embodiment, training module 512 can select an initial model, or other untrained model, from an appropriate repository 516 and utilize training data 514 to train a model, thereby generating a trained model (e.g., trained deep neural network) that can be used to classify similar types of data, or generate other such inferences. In at least one embodiment where training data is not used, an appropriate initial model can still be selected for training on input data per training module 512.

In at least one embodiment, a model can be trained in a number of different ways, as may depend in part upon a type of model selected. In at least one embodiment, a machine learning algorithm can be provided with a set of training data, where a model is a model artifact created by a training process. In at least one embodiment, each instance of training data contains a correct answer (e.g., classification), which can be referred to as a target or target attribute. In at least one embodiment, a learning algorithm finds patterns in training data that map input data attributes to a target, an answer to be predicted, and a machine learning model is output that captures these patterns. In at least one embodiment, a machine learning model can then be used to obtain predictions on new data for which a target is not specified.

In at least one embodiment, training and inference manager 532 can select from a set of machine learning models including binary classification, multiclass classification, generative, and regression models. In at least one embodiment, a type of model to be used can depend at least in part upon a type of target to be predicted.

Graphics Processing Pipeline

In an embodiment, the PPU 400 comprises a graphics processing unit (GPU). The PPU 400 is configured to receive commands that specify shader programs for processing graphics data. Graphics data may be defined as a set of primitives such as points, lines, triangles, quads, triangle strips, and the like. Typically, a primitive includes data that specifies a number of vertices for the primitive (e.g., in a model-space coordinate system) as well as attributes associated with each vertex of the primitive. The PPU 400 can be configured to process the graphics primitives to generate a frame buffer (e.g., pixel data for each of the pixels of the display).

An application writes model data for a scene (e.g., a collection of vertices and attributes) to a memory such as a system memory or memory 404. The model data defines each of the objects that may be visible on a display. The application then makes an API call to the driver kernel that requests the model data to be rendered and displayed. The driver kernel reads the model data and writes commands to the one or more streams to perform operations to process the model data. The commands may reference different shader programs to be implemented on the processing units within the PPU 400 including one or more of a vertex shader, hull shader, domain shader, geometry shader, and a pixel shader. For example, one or more of the processing units may be configured to execute a vertex shader program that processes a number of vertices defined by the model data. In an embodiment, the different processing units may be configured to execute different shader programs concurrently. For example, a first subset of processing units may be configured to execute a vertex shader program while a second subset of processing units may be configured to execute a pixel shader program. The first subset of processing units processes vertex data to produce processed vertex data and writes the processed vertex data to the L2 cache 460 and/or the memory 404. After the processed vertex data is rasterized (e.g., transformed from three-dimensional data into two-dimensional data in screen space) to produce fragment data, the second subset of processing units executes a pixel shader to produce processed fragment data, which is then blended with other processed fragment data and written to the frame buffer in memory 404. The vertex shader program and pixel shader program may execute concurrently, processing different data from the same scene in a pipelined fashion until all of the model data for the scene has been rendered to the frame buffer. Then, the contents of the frame buffer are transmitted to a display controller for display on a display device.

Figure 6A:
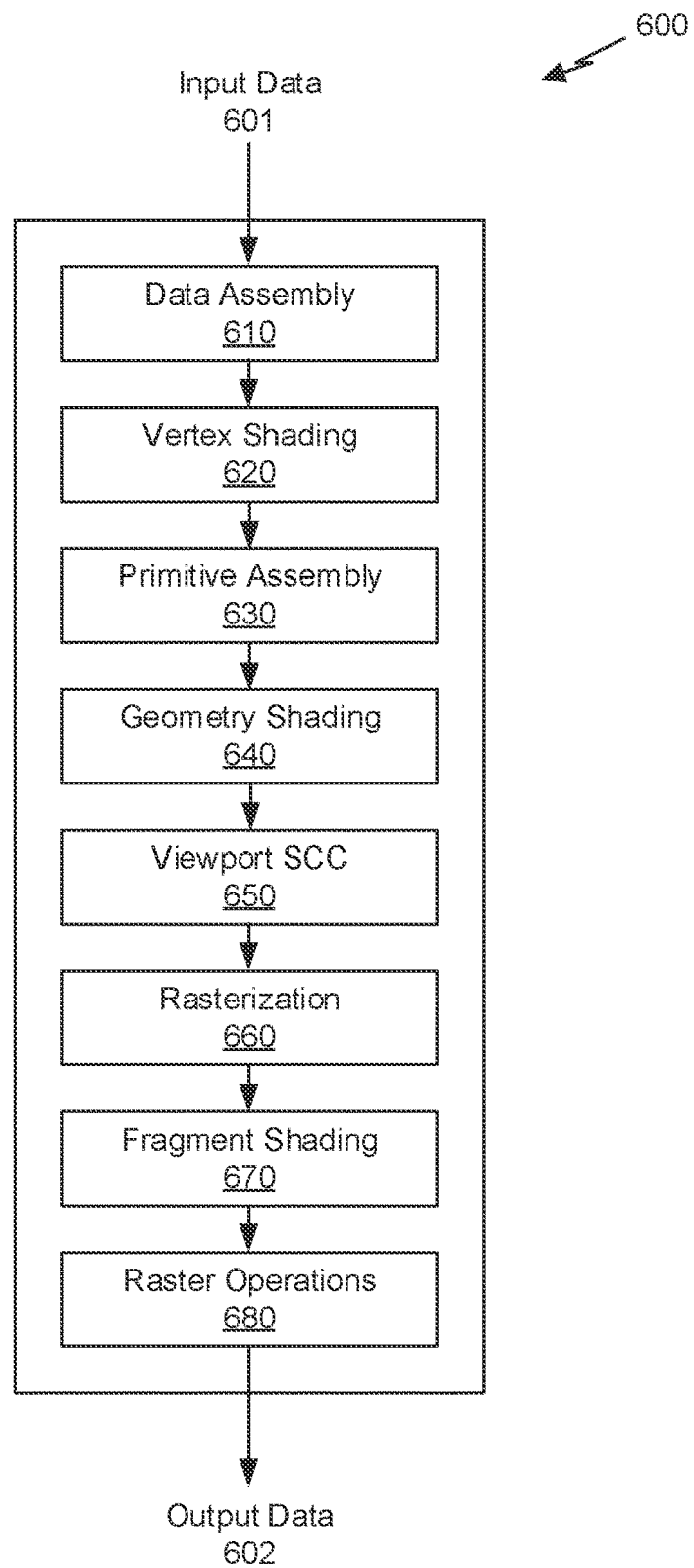
FIG. 6A is a conceptual diagram of a graphics processing pipeline implemented by the PPU of FIG. 4 suitable for use in implementing some embodiments of the present disclosure.

FIG. 6A is a conceptual diagram of a graphics processing pipeline 600 implemented by the PPU 400 of FIG. 4, in accordance with an embodiment. The graphics processing pipeline 600 is an abstract flow diagram of the processing steps implemented to generate 2D computer-generated images from 3D geometry data. As is well-known, pipeline architectures may perform long latency operations more efficiently by splitting up the operation into a plurality of stages, where the output of each stage is coupled to the input of the next successive stage. Thus, the graphics processing pipeline 600 receives input data 601 that is transmitted from one stage to the next stage of the graphics processing pipeline 600 to generate output data 602. In an embodiment, the graphics processing pipeline 600 may represent a graphics processing pipeline defined by the OpenGL® API. As an option, the graphics processing pipeline 600 may be implemented in the context of the functionality and architecture of the previous figures and/or any subsequent figure(s).

As shown in FIG. 6A, the graphics processing pipeline 600 comprises a pipeline architecture that includes a number of stages. The stages include, but are not limited to, a data assembly stage 610, a vertex shading stage 620, a primitive assembly stage 630, a geometry shading stage 640, a viewport scale, cull, and clip (VSCC) stage 650, a rasterization stage 660, a fragment shading stage 670, and a raster operations stage 680. In an embodiment, the input data 601 comprises commands that configure the processing units to implement the stages of the graphics processing pipeline 600 and geometric primitives (e.g., points, lines, triangles, quads, triangle strips or fans, etc.) to be processed by the stages. The output data 602 may comprise pixel data (e.g., color data) that is copied into a frame buffer or other type of surface data structure in a memory.

The data assembly stage 610 receives the input data 601 that specifies vertex data for high-order surfaces, primitives, or the like. The data assembly stage 610 collects the vertex data in a temporary storage or queue, such as by receiving a command from the host processor that includes a pointer to a buffer in memory and reading the vertex data from the buffer. The vertex data is then transmitted to the vertex shading stage 620 for processing.

The vertex shading stage 620 processes vertex data by performing a set of operations (e.g., a vertex shader or a program) once for each of the vertices. Vertices may be, e.g., specified as a 4-coordinate vector (e.g., <x,y,z,w>) associated with one or more vertex attributes (e.g., color, texture coordinates, surface normal, etc.). The vertex shading stage 620 may manipulate individual vertex attributes such as position, color, texture coordinates, and the like. In other words, the vertex shading stage 620 performs operations on the vertex coordinates or other vertex attributes associated with a vertex. Such operations commonly including lighting operations (e.g., modifying color attributes for a vertex) and transformation operations (e.g., modifying the coordinate space for a vertex). For example, vertices may be specified using coordinates in an object-coordinate space, which are transformed by multiplying the coordinates by a matrix that translates the coordinates from the object-coordinate space into a world space or a normalized-device-coordinate (NCD) space. The vertex shading stage 620 generates transformed vertex data that is transmitted to the primitive assembly stage 630.

The primitive assembly stage 630 collects vertices output by the vertex shading stage 620 and groups the vertices into geometric primitives for processing by the geometry shading stage 640. For example, the primitive assembly stage 630 may be configured to group every three consecutive vertices as a geometric primitive (e.g., a triangle) for transmission to the geometry shading stage 640. In some embodiments, specific vertices may be reused for consecutive geometric primitives (e.g., two consecutive triangles in a triangle strip may share two vertices). The primitive assembly stage 630 transmits geometric primitives (e.g., a collection of associated vertices) to the geometry shading stage 640.

The geometry shading stage 640 processes geometric primitives by performing a set of operations (e.g., a geometry shader or program) on the geometric primitives. Tessellation operations may generate one or more geometric primitives from each geometric primitive. In other words, the geometry shading stage 640 may subdivide each geometric primitive into a finer mesh of two or more geometric primitives for processing by the rest of the graphics processing pipeline 600. The geometry shading stage 640 transmits geometric primitives to the viewport SCC stage 650.

In an embodiment, the graphics processing pipeline 600 may operate within a streaming multiprocessor and the vertex shading stage 620, the primitive assembly stage 630, the geometry shading stage 640, the fragment shading stage 670, and/or hardware/software associated therewith, may sequentially perform processing operations. Once the sequential processing operations are complete, in an embodiment, the viewport SCC stage 650 may utilize the data. In an embodiment, primitive data processed by one or more of the stages in the graphics processing pipeline 600 may be written to a cache (e.g. L1 cache, a vertex cache, etc.). In this case, in an embodiment, the viewport SCC stage 650 may access the data in the cache. In an embodiment, the viewport SCC stage 650 and the rasterization stage 660 are implemented as fixed function circuitry.

The viewport SCC stage 650 performs viewport scaling, culling, and clipping of the geometric primitives. Each surface being rendered to is associated with an abstract camera position. The camera position represents a location of a viewer looking at the scene and defines a viewing frustum that encloses the objects of the scene. The viewing frustum may include a viewing plane, a rear plane, and four clipping planes. Any geometric primitive entirely outside of the viewing frustum may be culled (e.g., discarded) because the geometric primitive will not contribute to the final rendered scene. Any geometric primitive that is partially inside the viewing frustum and partially outside the viewing frustum may be clipped (e.g., transformed into a new geometric primitive that is enclosed within the viewing frustum. Furthermore, geometric primitives may each be scaled based on a depth of the viewing frustum. All potentially visible geometric primitives are then transmitted to the rasterization stage 660.

The rasterization stage 660 converts the 3D geometric primitives into 2D fragments (e.g. capable of being utilized for display, etc.). The rasterization stage 660 may be configured to utilize the vertices of the geometric primitives to setup a set of plane equations from which various attributes can be interpolated. The rasterization stage 660 may also compute a coverage mask for a plurality of pixels that indicates whether one or more sample locations for the pixel intercept the geometric primitive. In an embodiment, z-testing may also be performed to determine if the geometric primitive is occluded by other geometric primitives that have already been rasterized. The rasterization stage 660 generates fragment data (e.g., interpolated vertex attributes associated with a particular sample location for each covered pixel) that are transmitted to the fragment shading stage 670.

The fragment shading stage 670 processes fragment data by performing a set of operations (e.g., a fragment shader or a program) on each of the fragments. The fragment shading stage 670 may generate pixel data (e.g., color values) for the fragment such as by performing lighting operations or sampling texture maps using interpolated texture coordinates for the fragment. The fragment shading stage 670 generates pixel data that is transmitted to the raster operations stage 680.

The raster operations stage 680 may perform various operations on the pixel data such as performing alpha tests, stencil tests, and blending the pixel data with other pixel data corresponding to other fragments associated with the pixel. When the raster operations stage 680 has finished processing the pixel data (e.g., the output data 602), the pixel data may be written to a render target such as a frame buffer, a color buffer, or the like.

It will be appreciated that one or more additional stages may be included in the graphics processing pipeline 600 in addition to or in lieu of one or more of the stages described above. Various implementations of the abstract graphics processing pipeline may implement different stages. Furthermore, one or more of the stages described above may be excluded from the graphics processing pipeline in some embodiments (such as the geometry shading stage 640). Other types of graphics processing pipelines are contemplated as being within the scope of the present disclosure. Furthermore, any of the stages of the graphics processing pipeline 600 may be implemented by one or more dedicated hardware units within a graphics processor such as PPU 400. Other stages of the graphics processing pipeline 600 may be implemented by programmable hardware units such as the processing unit within the PPU 400.

The graphics processing pipeline 600 may be implemented via an application executed by a host processor, such as a CPU. In an embodiment, a device driver may implement an application programming interface (API) that defines various functions that can be utilized by an application in order to generate graphical data for display. The device driver is a software program that includes a plurality of instructions that control the operation of the PPU 400. The API provides an abstraction for a programmer that lets a programmer utilize specialized graphics hardware, such as the PPU 400, to generate the graphical data without requiring the programmer to utilize the specific instruction set for the PPU 400. The application may include an API call that is routed to the device driver for the PPU 400. The device driver interprets the API call and performs various operations to respond to the API call. In some instances, the device driver may perform operations by executing instructions on the CPU. In other instances, the device driver may perform operations, at least in part, by launching operations on the PPU 400 utilizing an input/output interface between the CPU and the PPU 400. In an embodiment, the device driver is configured to implement the graphics processing pipeline 600 utilizing the hardware of the PPU 400.

Various programs may be executed within the PPU 400 in order to implement the various stages of the graphics processing pipeline 600. For example, the device driver may launch a kernel on the PPU 400 to perform the vertex shading stage 620 on one processing unit (or multiple processing units). The device driver (or the initial kernel executed by the PPU 400) may also launch other kernels on the PPU 400 to perform other stages of the graphics processing pipeline 600, such as the geometry shading stage 640 and the fragment shading stage 670. In addition, some of the stages of the graphics processing pipeline 600 may be implemented on fixed unit hardware such as a rasterizer or a data assembler implemented within the PPU 400. It will be appreciated that results from one kernel may be processed by one or more intervening fixed function hardware units before being processed by a subsequent kernel on a processing unit.

Images generated applying one or more of the techniques disclosed herein may be displayed on a monitor or other display device. In some embodiments, the display device may be coupled directly to the system or processor generating or rendering the images. In other embodiments, the display device may be coupled indirectly to the system or processor such as via a network. Examples of such networks include the Internet, mobile telecommunications networks, a WIFI network, as well as any other wired and/or wireless networking system. When the display device is indirectly coupled, the images generated by the system or processor may be streamed over the network to the display device. Such streaming allows, for example, video games or other applications, which render images, to be executed on a server, a data center, or in a cloud-based computing environment and the rendered images to be transmitted and displayed on one or more user devices (such as a computer, video game console, smartphone, other mobile device, etc.) that are physically separate from the server or data center. Hence, the techniques disclosed herein can be applied to enhance the images that are streamed and to enhance services that stream images such as NVIDIA GeForce Now (GFN), Google Stadia, and the like.

Example Game Streaming System

Figure 6B:
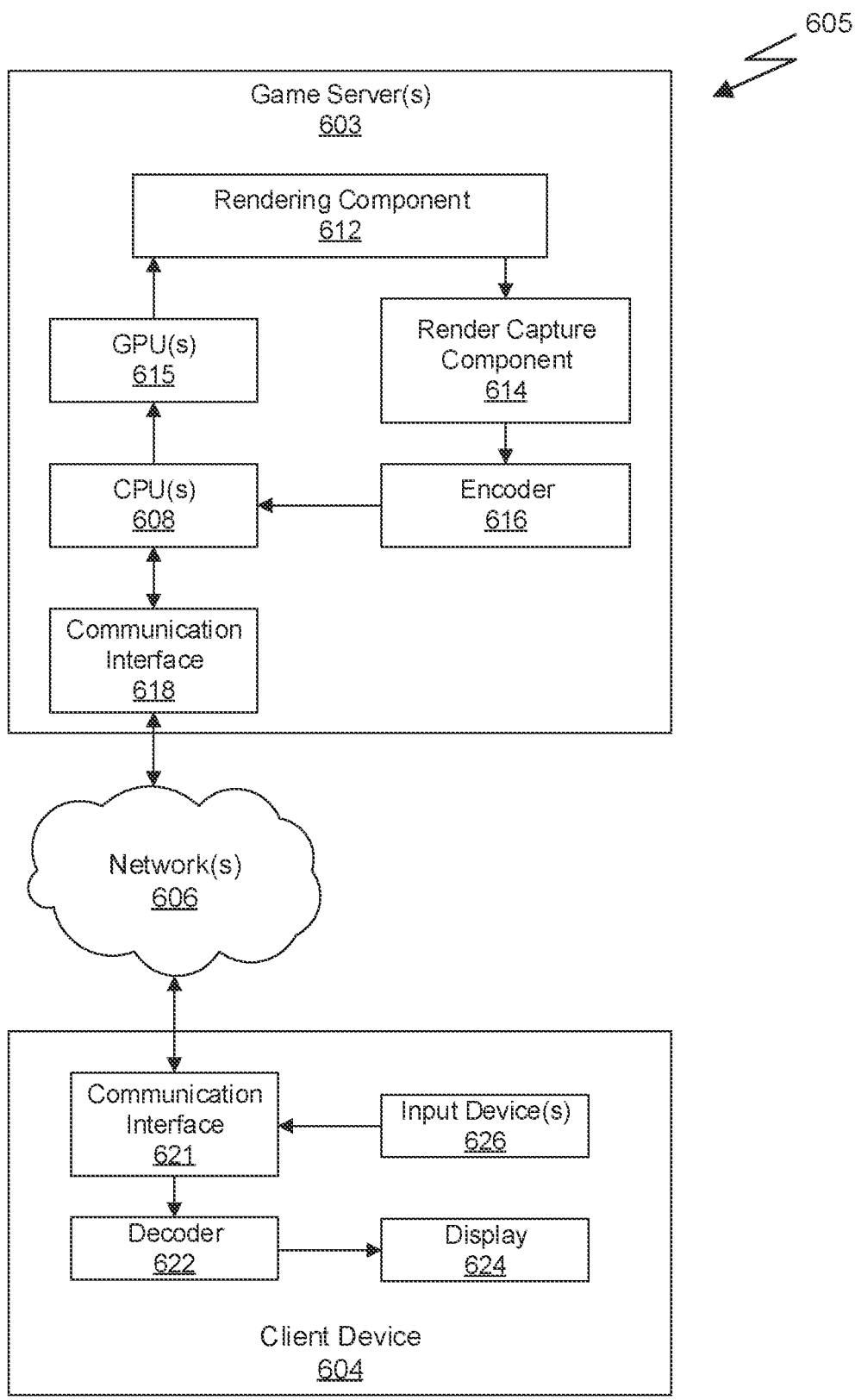
FIG. 6B illustrates an exemplary game streaming system suitable for use in implementing some embodiments of the present disclosure.

FIG. 6B is an example system diagram for a game streaming system 605, in accordance with some embodiments of the present disclosure. FIG. 6B includes game server(s) 603 (which may include similar components, features, and/or functionality to the example processing system 500 of FIG. 5A and/or exemplary system 565 of FIG. 5B), client device(s) 604 (which may include similar components, features, and/or functionality to the example processing system 500 of FIG. 5A and/or exemplary system 565 of FIG. 5B), and network(s) 606 (which may be similar to the network(s) described herein). In some embodiments of the present disclosure, the system 605 may be implemented.

In the system 605, for a game session, the client device(s) 604 may only receive input data in response to inputs to the input device(s), transmit the input data to the game server(s) 603, receive encoded display data from the game server(s) 603, and display the display data on the display 624. As such, the more computationally intense computing and processing is offloaded to the game server(s) 603 (e.g., rendering—in particular ray or path tracing—for graphical output of the game session is executed by the GPU(s) of the game server(s) 603). In other words, the game session is streamed to the client device(s) 604 from the game server(s) 603, thereby reducing the requirements of the client device(s) 604 for graphics processing and rendering.

For example, with respect to an instantiation of a game session, a client device 604 may be displaying a frame of the game session on the display 624 based on receiving the display data from the game server(s) 603. The client device 604 may receive an input to one of the input device(s) and generate input data in response. The client device 604 may transmit the input data to the game server(s) 603 via the communication interface 621 and over the network(s) 606 (e.g., the Internet), and the game server(s) 603 may receive the input data via the communication interface 618. The CPU(s) may receive the input data, process the input data, and transmit data to the GPU(s) that causes the GPU(s) to generate a rendering of the game session. For example, the input data may be representative of a movement of a character of the user in a game, firing a weapon, reloading, passing a ball, turning a vehicle, etc. The rendering component 612 may render the game session (e.g., representative of the result of the input data) and the render capture component 614 may capture the rendering of the game session as display data (e.g., as image data capturing the rendered frame of the game session). The rendering of the game session may include ray or path-traced lighting and/or shadow effects, computed using one or more parallel processing units—such as GPUs, which may further employ the use of one or more dedicated hardware accelerators or processing cores to perform ray or path-tracing techniques—of the game server(s) 603. The encoder 616 may then encode the display data to generate encoded display data and the encoded display data may be transmitted to the client device 604 over the network(s) 606 via the communication interface 618. The client device 604 may receive the encoded display data via the communication interface 621 and the decoder 622 may decode the encoded display data to generate the display data. The client device 604 may then display the display data via the display 624.

It is noted that the techniques described herein may be embodied in executable instructions stored in a computer readable medium for use by or in connection with a processor-based instruction execution machine, system, apparatus, or device. It will be appreciated by those skilled in the art that, for some embodiments, various types of computer-readable media can be included for storing data. As used herein, a "computer-readable medium" includes one or more of any suitable media for storing the executable instructions of a computer program such that the instruction execution machine, system, apparatus, or device may read (or fetch) the instructions from the computer-readable medium and execute the instructions for carrying out the described embodiments. Suitable storage formats include one or more of an electronic, magnetic, optical, and electromagnetic format. A non-exhaustive list of conventional exemplary computer-readable medium includes: a portable computer diskette; a random-access memory (RAM); a read-only memory (ROM); an erasable programmable read only memory (EPROM); a flash memory device; and optical storage devices, including a portable compact disc (CD), a portable digital video disc (DVD), and the like.

It should be understood that the arrangement of components illustrated in the attached figures are for illustrative purposes and that other arrangements are possible. For example, one or more of the elements described herein may be realized, in whole or in part, as an electronic hardware component. Other elements may be implemented in software, hardware, or a combination of software and hardware. Moreover, some or all of these other elements may be combined, some may be omitted altogether, and additional components may be added while still achieving the functionality described herein. Thus, the subject matter described herein may be embodied in many different variations, and all such variations are contemplated to be within the scope of the claims.

To facilitate an understanding of the subject matter described herein, many aspects are described in terms of sequences of actions. It will be recognized by those skilled in the art that the various actions may be performed by specialized circuits or circuitry, by program instructions being executed by one or more processors, or by a combination of both. The description herein of any sequence of actions is not intended to imply that the specific order described for performing that sequence must be followed. All methods described herein may be performed in any suitable order unless otherwise indicated herein or otherwise clearly contradicted by context.

The use of the terms "a" and "an" and "the" and similar references in the context of describing the subject matter (particularly in the context of the following claims) are to be construed to cover both the singular and the plural, unless otherwise indicated herein or clearly contradicted by context. The use of the term "at least one" followed by a list of one or more items (for example, "at least one of A and B") is to be construed to mean one item selected from the listed items (A or B) or any combination of two or more of the listed items (A and B), unless otherwise indicated herein or clearly contradicted by context. Furthermore, the foregoing description is for the purpose of illustration only, and not for the purpose of limitation, as the scope of protection sought is defined by the claims as set forth hereinafter together with any equivalents thereof. The use of any and all examples, or exemplary language (e.g., "such as") provided herein, is intended merely to better illustrate the subject matter and does not pose a limitation on the scope of the subject matter unless otherwise claimed. The use of the term "based on" and other like phrases indicating a condition for bringing about a result, both in the claims and in the written description, is not intended to foreclose any other conditions that bring about that result. No language in the specification should be construed as indicating any non-claimed element as essential to the practice of the invention as claimed.

What is claimed is:

1. A computer-implemented method for generating a projective hash map, comprising:

receiving data associated with a plurality of points in an N-dimensional space; and for each point in the plurality of points:
projecting the point onto a projection surface to generate projected coordinates for the point, wherein the projected coordinates have less than N dimensions,
generating a hash value for the point based on a hash key that includes the projected coordinates, and
adding data corresponding to the point to a data structure for the projective hash map based on the hash value.

2. The computer-implemented method of claim 1, wherein the N-dimensional space is a three-dimensional space, and the projected coordinates include two-dimensional coordinates <u, v>.

3. The computer-implemented method of claim 2, wherein:
the data is generated by a graphics application that is configured to render an image for display in accordance with a virtual camera position in the N-dimensional space, and
the projection surface is one of a plurality of projection surfaces arranged around the virtual camera position, and a first projection surface is co-planar with a near plane of a view frustum of the image.

4. The computer-implemented method of claim 3, wherein projecting the point onto the projection surface comprises determining a surface index for a particular projection surface of the plurality of projections surfaces that intersects a ray that connects the point and the virtual camera position.

5. The computer-implemented method of claim 4, wherein the hash key further includes the surface index.

6. The computer-implemented method of claim 5, the method further comprising:
querying the data structure using a plurality of hash values, wherein at least two hash values are generated based on hash keys that include different surface index values.

7. The computer-implemented method of claim 1, wherein the N-dimensional space is a three-dimensional space, the projection surface comprises a spherical surface, and the projected coordinates include two-dimensional coordinates <θ, φ>.

8. The computer-implemented method of claim 1, wherein the hash key further includes a level-of-detail (LOD) indicator, and wherein adding the data corresponding to the point to the data structure comprises:
generating multiple hash values for different LOD indicator values; and
adding multiple copies of the data to the data structure in accordance with the multiple hash values.

9. The computer-implemented method of claim 1, wherein:
the data is generated by a graphics application that is configured to render an image for display,
the image is rendered in accordance with a virtual camera position in the N-dimensional space,
the projection surface is located in the N-dimensional space relative to the virtual camera position to match a viewing plane of the image within the graphics application, and
a level-of-detail (LOD) corresponding to a subdivision the projection surface matches a pixel resolution of the image.

10. The computer-implemented method of claim 1, wherein the hash key further includes a slice index based on a dimension d that indicates a distance from the point to a virtual camera position associated with the projection surface or a distance from the point to the projection surface.

11. The computer-implemented method of claim 1, the method further comprising querying the projective hash map by:
identifying a search area on the projection surface based on projected coordinates of a query point in the N-dimensional space;
determine a plurality of hash values corresponding to the search area; and
querying the projective hash map in accordance with the plurality of hash values for the search area to determine whether the projective hash map includes data for points that, when projected onto the projection surface, intersect the search area.

12. The computer-implemented method of claim 1, wherein at least one of the projected coordinates is quantized according to a quantization parameter prior to generating the hash key.

13. The computer-implemented method of claim 1, wherein the projective hash map is generated by a server or in a data center and utilized by a graphics application to generate an image, and the image is streamed to a user device via a network.

14. The computer-implemented method of claim 1, wherein the projective hash map is utilized by a graphics application to generate an image used for training, testing, or certifying a neural network employed in a machine, robot, or autonomous vehicle.

15. A system, comprising:
a memory configured to store data associated with a plurality of points in an N-dimensional space and a data structure for a projective hash map; and
a processor configured to generate the projective hash map by, for each point in the plurality of points:
project the point onto a projection surface to generate projected coordinates for the point, wherein the projected coordinates have less than N dimensions,
generate a hash value for the point based on a hash key that includes the projected coordinates, and
add data corresponding to the point to the data structure for the projective hash map based on the hash value.

16. The system of claim 15, wherein:
the N-dimensional space is a three-dimensional (3D) space, and the projected coordinates include two-dimensional (2D) coordinates <u, v>;
the data is generated by a graphics application that is configured to render an image for display in accordance with a virtual camera position in the 3D space, and
the projection surface is one of a plurality of projection surfaces arranged around the virtual camera position, and a first projection surface is co-planar with a near plane of a view frustum of the image.

17. The system of claim 16, wherein projecting the point onto the projection surface comprises determining a surface index for a particular projection surface of the plurality of projection surfaces that intersects a ray that connects the point and the virtual camera position, and wherein the hash key further includes the surface index.

18. The system of claim 15, wherein the N-dimensional space is a three-dimensional space, the projection surface comprises a spherical surface, and the projected coordinates include two-dimensional coordinates <θ, φ>.

19. The system of claim 15, wherein the hash key further includes a level-of-detail (LOD) indicator, and wherein adding the data corresponding to the point to the data structure comprises:
- generating multiple hash values for different LOD indicator values; and
- adding multiple copies of the data to the data structure in accordance with the multiple hash values.

20. The system of claim 15, wherein the processor and the memory are included in a server or in a data center and the projective hash map is utilized by a graphics application to generate an image, and the image is streamed to a user device via a network.

21. The system of claim 15, wherein at least one of the projected coordinates is quantized according to a quantization parameter prior to generating the hash key.

22. A non-transitory computer-readable media storing computer instructions for generating a projective hash map for storing data associated with a plurality of points in an N-dimensional space, and the computer instructions, when executed by one or more processors, cause the one or more processors to perform the steps of:
- receiving data associated with a plurality of points in an N-dimensional space; and
- for each point in the plurality of points:
  - projecting the point onto a projection surface to generate projected coordinates for the point, wherein the projected coordinates have less than N dimensions,
  - generating a hash value for the point based on a hash key that includes the projected coordinates, and
  - adding data corresponding to the point to a data structure for the projective hash map based on the hash value.

* * * * *